United States Patent
Shiraishi et al.

(10) Patent No.: US 7,470,391 B2
(45) Date of Patent: Dec. 30, 2008

(54) METHOD AND UNIT FOR CONTINUOUSLY PRODUCING METAL MICROPARTICLE

(75) Inventors: Fumiko Shiraishi, Minami-Ashigara (JP); Yasunori Ichikawa, Minami-Ashigara (JP); Koukichi Waki, Minami-Ashigara (JP); Seiji Sugiyama, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 522 days.

(21) Appl. No.: 10/975,377

(22) Filed: Oct. 29, 2004

(65) Prior Publication Data
US 2005/0093211 A1    May 5, 2005

(30) Foreign Application Priority Data
Oct. 29, 2003   (JP)   ............................. 2003-368899

(51) Int. Cl.
*C22B 3/02* (2006.01)
(52) U.S. Cl. .................................. 266/157; 266/170
(58) Field of Classification Search ................. 266/157
See application file for complete search history.

(56) References Cited

U.S. PATENT DOCUMENTS

| 6,063,138 A * | 5/2000 | Hanna et al. .............. 23/295 R |
| 6,284,021 B1 | 9/2001 | Lu et al. |
| 6,450,344 B1 * | 9/2002 | Kitano et al. ............... 209/170 |
| 6,960,294 B2 * | 11/2005 | Arnaud ..................... 210/195.1 |
| 7,238,331 B2 * | 7/2007 | Zhou et al. ..................... 423/1 |

FOREIGN PATENT DOCUMENTS

| JP | 7-253272 A | 10/1995 |
| JP | 11-281637 A | 10/1999 |
| JP | 11-333236 A | 12/1999 |
| JP | 2002-52325 A | 2/2002 |
| JP | 2002-529228 A | 9/2002 |
| JP | 2002-529233 A | 9/2002 |

* cited by examiner

*Primary Examiner*—George Wyszomierski
(74) *Attorney, Agent, or Firm*—Sughrue Mion, PLLC

(57) ABSTRACT

The producing unit for continuously producing metal microparticles formed of a multicomponent alloy accompanied by the generation of a byproduct gas through an early reaction of the formation of the metal particles comprises a first mixing unit for continuously supplying and mixing a plurality of solutions for conducting the early reaction, a second mixing unit for continuously supplying another solution to the reaction liquid containing the metal microparticles formed in the early reaction and for mixing the two solutions, to introduce dissimilar metal atoms into the crystal lattices of the metal microparticles, and a gas-liquid separation unit that is installed in a midway of the pipe which is made so as to have enough length to finish the early reaction, and which continuously passes the reaction liquid to the second mixing unit from the first mixing unit, and that continuously removes the byproduct gas generated with the proceeding of the early reaction.

11 Claims, 23 Drawing Sheets

METHOD AND UNIT FOR CONTINUOUSLY PRODUCING METAL MICROPARTICLE

BACKGROUND OF THE INVENTION

1. Field of the Invention

The present invention relates to a method and a unit for continuously producing metal microparticles, and relates to a method and a unit for continuously producing metal microparticles which are particularly formed of a multicomponent alloy through an early reaction accompanied by the generation of a byproduct gas.

2. Description of the Related Art

Attention is directed at metal microparticles formed of a multicomponent alloy, as magnetic particles which can enhance the coercive force of a magnetic layer constituting a magnetic record medium. In producing the metal microparticles, an initial reaction for forming the metal microparticles is occasionally accompanied by the generation of a byproduct gas.

The reaction accompanied by the byproduct gas is so hardly continued that a continuous unit for continuously producing the above described metal microparticles has not yet practically been realized. That is because 1 mol of a byproduct gas produces the byproduct gas expanded to as large a volume as 22.4 l, and in the case of continuous treatment, unless the byproduct gas can be effectively removed in the flow of the continuous treatment, it causes various detrimental effects. For instance, if the byproduct gas can not be effectively removed in the flow of the continuous treatment, the flow of the continuous treatment becomes unstable to make a mixing field and a reaction field nonuniform, and thereby to make the equilibrium of the reaction hardly proceed to a reaction-accelerating direction. In addition, when a temperature of a solution is controlled for the reaction, if the byproduct gas can not be effectively removed in the flow of the continuous treatment, the reaction temperature can not be accurately controlled, because gas has a low coefficient of thermal conductivity. As a result of the detrimental effects, there arise such problems that the produced metal microparticles increase in particle sizes, and that the monodispersibility gets worse.

There are various general methods for separating and removing gas from liquid. The typical ones include a degassing method with a separating film (for instance, Japanese Patent Application Publication No. 11-333236, Japanese Patent Application Publication No. 7-253272 and Japanese Patent Application Publication No. 2002-52325); a degassing method by using an adsorbent having gas absorptiveness (for instance, Japanese Patent Application Publication No. 2001-113115); a degassing method by decompression; a degassing method by heating; and a degassing method by mechanical methods such as a cyclone method and a trapping method (for instance, Japanese Publication of International Patent Application No. 2002-529228, Japanese Publication of International Patent Application No. 2002-529233 and Japanese Patent Application Publication No. 11-281637).

SUMMARY OF THE INVENTION

When a degassing method with a separating film is to be employed, such various durabilities are required to the film materials, as durability to a reactive raw material, durability to a product produced by a reaction, and durability to a solvent for dissolving a raw material. However, there is a problem that such a film material as to satisfy them does not exist. Accordingly, the degassing method with the separating film has no problem in the case of treating a gas and a liquid having low reactivity such as in degassing of dissolved oxygen in water, but can not be applied to degassing for a byproduct gas generated by a reaction.

A degassing method utilizing adsorption has many restrictions in chemical resistance and solvent resistance of an adsorbent, as in the case of a separating film, and has a further problem that, in order to speed up the adsorption, incidental facilities such as a compression device are necessary, which make the unit complicated.

A degassing method using decompression can remove gas through a decompressing operation, but when a raw material, a solvent and a reaction product are volatile, the degassing method can not be used, because they also volatilize by decompression. When the method is still used, the method needs an operation of separating the raw material, the solvent and the reaction product which have volatilized together with the gas, in a later step of degassing treatment, and thus causes a problem of making the unit complicated.

A degassing method using heat can remove gas by a heating operation, as in the case of the method using decompression. However, when a raw material, a solvent and a reaction product are volatile, there is a problem that these also volatilize together with the gas by heat.

A conventional mechanical degassing method is based on the premise that the object is not accompanied by the continuous generation of gas as in the case of gas separation from a mixture of a solid and a gas, and in the case of removing a dissolved gas from the dissolving liquid, and for that reason, consideration is not made for a process for continuously separating a gas which is continuously generated depending on a proceeding condition of a reaction, as in the case of a byproduct gas generated by the reaction. Accordingly, even if a conventional mechanical degassing method is simply applied to continuous treatment for metal microparticles as a gas-liquid separation unit, the flow of a reaction liquid is destabilized to make a mixing field and a reaction field unstable, and consequently metal microparticles having small particle sizes and adequate monodispersibility cannot be produced.

As described above, a conventional degassing method has not been applied for removing a gas which is rapidly generated by a reaction in a large quantity. Because of this, conventionally, the production of metal microparticles formed of a multicomponent alloy through a reaction accompanied by the generation of a byproduct gas cannot help being performed by so-called a batch system which sequentially carries out each step in one tank. As a result of this, there are problems that the sizes of the metal microparticles are hardly micrified, the dispersibility of the produced the metal microparticles varies depending on the batch, and thereby the metal microparticles of a constant quality cannot be stably produced.

The present invention is designed with respect to such circumstances and is directed at providing a method and a unit for continuously producing metal microparticles, which can make a production process for the metal microparticles formed of a multicomponent alloy through a reaction accompanied by the generation of a byproduct gas continuous, can effectively remove the byproduct gas even in a continuous process to stabilize and uniformize a reaction, and thereby can stably produce the metal microparticles having small particle sizes, superior monodispersibility and a constant quality.

A first aspect according to the present invention for achieving the above described object is producing a unit for continuously producing metal microparticles formed of a multicomponent alloy accompanied by the generation of a byproduct gas through an early reaction of the formation of the metal microparticles comprising: a first mixing unit for continuously supplying and mixing a plurality of solutions for proceeding the early reaction; a second mixing unit for continuously supplying another solution to a reaction liquid containing the metal microparticles formed in the early reaction and for mixing the two solutions, to introduce dissimilar metal atoms into the crystal lattice of the metal microparticle; and a gas-liquid separation unit that is installed in a midway of a pipe which is made so as to have enough length to finish the early reaction, and which continuously passes the reaction liquid to the second mixing unit from the first mixing unit, and that continuously removes the byproduct gas generated with the proceeding of the early reaction.

The adoption of a flow reaction system which conducts an early reaction of first and second solutions caused by mixing in a pipe, enables the continuous production of metal microparticles. However, in the case of a reaction accompanied by the generation of a byproduct gas, it is extremely important for stably producing the metal microparticles having small sizes, adequate monodispersibility and a constant quality, to stabilize the flow of a reaction liquid and uniformize the reaction by stably removing the byproduct gas from the reaction liquid flowing through the pipe. This is because in the production of the metal microparticles formed of a multicomponent alloy, it is extremely important for adequately controlling a reaction in the second mixing unit, to accurately control the duration time after plural sorts of solutions are mixed in the first mixing unit and the early reaction starts until another solution is added to the reaction liquid in the second mixing unit and because unless the flow of the reaction liquid is stabilized due to the byproduct gas, the above described duration time varies. For that reason, by accurately controlling the duration time, dissimilar metal atoms are introduced into the metal microparticles just when a nuclear-forming reaction of the early reaction has ended and a nuclear growth reaction has proceeded for a predetermined time, which is very effective. In addition, if the byproduct gas remains in the reaction liquid after mixing in the second mixing unit, the byproduct gas hinders uniform mixing in the second mixing unit, and makes the reaction for introducing the dissimilar metal atoms into the crystal lattice of the metal microparticle unstable.

Then, a producing unit for continuously producing metal microparticles according to the first aspect in the present invention, makes plural sorts of solutions mixed in the first mixing unit conduct the reaction in the pipe between the first mixing unit and the second mixing unit, and makes a gas-liquid separation unit installed in the midway of the pipe continuously remove a byproduct gas generated with the proceeding of the reaction, to stabilize the flow of a reaction liquid passing through the pipe. In addition, the continuous removal of the byproduct gas is considered to advance the equilibrium of the reaction to a reaction-accelerating side, and thereby to improve the reactivity. Furthermore, because the continuous removal does not leave the byproduct gas in the reaction liquid in the second mixing unit, it accelerates the uniform mixing of the reaction liquid in the second mixing unit.

Because of this, a continuous production unit uniformizes a reaction accompanied by the generation of a byproduct gas, accelerates the reaction, and uniformizes the reaction in the second mixing unit, and thereby enables the metal microparticles of a multicomponent alloy to be stably produced so as to acquire small sizes and superior monodispersibility along with a constant quality. Furthermore, if the continuous production process for the metal microparticles of a multicomponent alloy is established like in the present invention, the process eliminates batch-by-batch variations in the quality of the metal microparticles like production in a conventional batch system, and thereby enables the metal microparticles of a multicomponent alloy to be stably produced so as to have small sizes, superior monodispersibility and a constant quality.

In a second aspect according to the present invention, in the producing unit for continuously producing metal microparticles according to the first aspect, the plural sorts of solutions mixed in the first mixing unit comprise a first solution containing two or more metal ions selected from the group consisting of the families 8, 9 and 10 in the periodic table and a second solution containing a reducing agent; and the solution to be mixed with the reaction liquid in the second mixing unit comprises a third solution containing one or more metal ions selected from the group consisting of families 11, 12, 13, 14 and 15 in the periodic table.

The present invention is suitable for a producing unit for continuously producing metal microparticles of a multicomponent alloy, which are contained in a magnetic layer of a magnetic record medium, and the second aspect indicates the embodiment of preferably used solutions therefor.

In a third aspect according to the present invention, in the producing unit for continuously producing metal microparticles according to the first or second aspect, at least one of the first and second mixing units is a high-speed stirring and mixing unit that has stirring blades of which the tips rotate at a rotational peripheral velocity of 5 m/second or higher, inside the mixing tank which has such a narrow volume as has a retention time of 10 seconds or shorter, and that instantly and uniformly mixes the plural sorts of the solutions and immediately discharges the mixed solution from the mixing tank.

This is because the first and second mixing units preferably have a structure which instantly and uniformly mixes plural sorts of solutions and immediately discharges the mixed and reacted reaction liquid.

In a fourth aspect according to the present invention, in the producing unit for continuously producing metal microparticles according to the first or second aspect, at least one of the first and second mixing units is a narrow-gap mixing unit which conducts mixing with a narrow-gap formed between the inner wall of a mixing vessel and a stirring member rotating at a high speed in the mixing vessel, and in order to form the narrow-gap, has a distance between the rotation center of the stirring member and the inner wall closest therefrom set in a range of 1.001 to 1.200 when the distance between the rotation center of the stirring member and the tip is defined as 1, and which instantly and uniformly mixes the plural sorts of the solutions and immediately discharges the mixed solution from the mixing vessel.

The fourth aspect shows another embodiment preferable for the first and second mixing units. The narrow-gap mixing unit conducts mixing with a narrow-gap formed between the inner wall of a mixing vessel and a stirring member rotating at a high speed in the mixing vessel, and when the unit is employed for the mixing, it can instantly and uniformly mix plural sorts of solutions, and immediately discharge the mixed solution from the mixing vessel.

In a fifth aspect according to the present invention, in the producing unit for continuously producing metal microparticles according to the first or second aspect, at least one of the first and second mixing units is a high-pressure mixing unit which supplies at least one solution of plural sorts of solutions into a mixing chamber having a retention time of 5 seconds or shorter, in the form of a jet flow with a high pressure of 1 MPa or higher, and which instantly and uniformly mixes the plural sorts of the solutions and immediately discharges the mixed solution from the mixing chamber.

The fifth aspect shows further another embodiment preferable for the first and second mixing units. The high-pressure mixing unit supplies at least one of plural sorts of solutions into a mixing chamber having a retention time of 5 seconds or shorter in the form of a jet flow with a high pressure of 1 MPa or higher. In this case, it is recommendable to utilize mixing force by eddy viscosity formed in a mixing chamber by sprouting one of the plural sorts of the solutions to the mixing chamber in the form of the jet flow with a high pressure of 1 MPa or higher, and supplying the other solutions to the mixing chamber so as to follow the high-pressure jet flow. Alternatively, it is recommendable to utilize mixing force by eddy viscosity formed by sprouting the plural sorts of the solutions in the form of the jet flow with a high pressure of 1 MPa or higher so as to face each other and colliding a plurality of the high-pressure jet flows.

In a sixth aspect according to the present invention, in the producing unit for continuously producing metal microparticles according to any one of the first to fifth aspects, the gas-liquid separation unit comprises a gas-liquid separation structure which is connected to a midway of the pipe, has a larger space than the pipe in terms of a volume per unit length and has a gas-liquid interface formed when a reaction liquid flows through the space, and a pressure adjustment device for adjusting the pressure of a headspace part above the gas-liquid interface; and continuously removes a byproduct gas contained in the reaction liquid by floatation, while the reaction liquid passes through the gas-liquid separation structure.

Preferably, the gas-liquid separation unit can continuously and efficiently remove a byproduct gas which is continuously generated with the proceeding of a reaction of generating the byproduct gas in the first mixing unit.

In a gas-liquid separation unit according to the sixth aspect, when a reaction liquid is passed so as to flow through a gas-liquid separation structure having a larger space in terms of a volume per unit length than the pipe has, a gas-liquid interface is formed in the gas-liquid separation structure. As a result of this, a byproduct gas generated with a reaction changes into bubbles, moves upward in a reaction liquid and is continuously released from the gas-liquid interface into a headspace part. Accordingly, the byproduct gas can be continuously and effectively removed from the reaction liquid.

As for a relationship between a gas-liquid separation structure and the pipe connected to the gas-liquid separation structure, the gas-liquid separation structure has preferably 1.5 times as large a volume as or a larger volume per unit length than the pipe of the same unit length has. The gas-liquid separation structure preferably has enough length in a reaction liquid flow direction, for the bubbles generated in the bottom part of the gas-liquid separation structure when the reaction liquid flows into the gas-liquid separation structure, to rise to the surface and be released into the headspace part before the reaction liquid flows out from the gas-liquid separation structure.

The byproduct gas floatated from a reaction liquid in the degassing process is accumulated in a headspace part to increase a pressure in a gas-liquid separation structure, varies the position of a gas-liquid interface, and thereby destabilizes the flow of a reaction liquid. Accordingly, a pressure adjustment device adjusts the pressure of the headspace part into a constant predetermined pressure. Specifically, the pressure of the head space part is adjusted to the predetermined pressure so that the height of the gas-liquid interface in the gas-liquid separation structure can be always constant. For instance, the pressure of the headspace part is adjusted so that the cross sectional area of the reaction liquid flowing through the gas-liquid separation structure can be approximately equal to the cross sectional area of the reaction liquid flowing through the pipe.

In a seventh aspect according to the present invention, in the producing unit for continuously producing metal microparticles according to any one of the first to fifth aspects, the gas-liquid separation unit comprises a convolute flow-producing tank which is connected to a midway of the pipe, and produces a convolute flow in a reaction liquid, a convolute flow-speed adjustment device for making a real flow speed to be 2 m/second or higher, along with making the inflow speed of the reaction liquid flowing into the convolute flow-producing tank to be twice as large as or larger than the flow speed of the reaction liquid flowing through the pipe, and a pressure adjustment device for adjusting the pressure in the convolute flow-producing tank; and continuously removes a byproduct gas from the reaction liquid by taking advantage of a centrifugal force generated by the convolute flow of the reaction liquid containing the byproduct gas having a different specific gravity from that of the reaction liquid.

The seventh aspect shows another embodiment preferable for a gas-liquid separation unit which utilizes the principle of a cyclone in order to continuously and efficiently remove a byproduct gas from a reaction liquid, and has a reducing member such as an orifice installed in the inlet of a convolute flow-producing tank so that the inflow speed of the reaction liquid flowing into the convolute flow-producing tank from the pipe can be twice as large as or larger than the flow speed of the reaction liquid flowing through the pipe, and so that the flow speed can be 2 m/second or higher.

The gas-liquid separation unit of the seventh aspect according to the present invention produces a convolute flow in a reaction liquid in a convolute flow-producing tank, and exerts centrifugal force in the reaction liquid. Owing to the centrifugal force, the reaction liquid (a liquid) having a higher specific gravity tends to gather in the perimeter inside the convolute flow-producing tank, and a byproduct gas (a gas) having a lower specific gravity tends to gather in the center of the convolute flow-producing tank, so that the reaction liquid moves downward along the inner wall of the convolute flow-producing tank while convoluting and is collected in the bottom of the convolute flow-producing tank, whereas the byproduct gas having a lower specific gravity moves upward in the center of the convolute flow-producing tank and is collected in the upper part of the convolute flow-producing tank. Accordingly, the byproduct gas can be continuously and effectively removed from a reaction liquid.

A byproduct gas released from a reaction liquid in the degassing process is collected in a convolute flow-producing tank, varies a pressure in the tank, and destabilizes the inflow of the reaction liquid into the convolute flow-producing tank. Because the unstable inflow destabilizes the flow of the reaction liquid, a pressure adjustment device adjusts the pressure in the convolute flow-producing tank so as to be kept constant.

In an eighth aspect according to the present invention, in the producing unit for continuously producing metal microparticles according to any one of the first to fifth aspects, the gas-liquid separation unit comprises a troughed spiral channel which is connected to a midway of the pipe and has the upper part opened, a spiral channel tank housing the spiral channel, and a pressure adjustment device for adjusting the pressure in the spiral channel tank; and continuously removes a byproduct gas in a reaction liquid by floatation, while passing the reaction liquid downward through the spiral channel at the approximately same speed as the flow speed of the reaction liquid flowing in the pipe.

The eighth aspect shows further another embodiment preferable for a gas-liquid separation unit which passes the reaction liquid through a spiral channel having the upper part opened, and can floatate and separate bubbles in a reaction liquid consisting of a byproduct gas generated with the proceeding of the reaction, at all times. In this case, the spiral channel preferably has the length in which the generation of a byproduct gas by a reaction is finished. In addition, it is important for the flow speed of the reaction liquid flowing downward through the spiral channel to be approximately equal to the flow speed of the reaction liquid flowing through the pipe before flowing into the spiral channel, in order not to destabilize the reaction liquid flowing through the pipe, and for this purpose, it is recommendable to adjust the width and spiral gradient of the spiral channel.

In a ninth aspect according to the present invention, in the producing unit for continuously producing metal microparticles according to any one of the first to fifth aspects, in order to control a reaction in the second mixing unit, a duration time necessary for a reaction liquid having flowed out from the first mixing unit to reach the second mixing unit through the gas-liquid separation unit is set. Thus set duration time makes dissimilar metal atoms introduced into metal microparticles in the second mixing unit, just when an early reaction for forming the metal microparticles has been finished and the growth reaction has proceeded for a predetermined time. Thereby, the dissimilar metal atoms can be effectively introduced to the metal microparticles formed in an early reaction.

In a tenth aspect according to the present invention, in the producing unit for continuously producing metal microparticles according to the ninth aspect, the duration time is set to one minute or longer but 20 minutes or shorter. The aspect prescribes the appropriate duration time for the metal microparticles generated in an early reaction reaches the second mixing unit after leaving the first mixing unit, which is necessary for dissimilar metal atoms to be effectively introduced to the metal microparticles. When the duration time is shorter than one minute, the reaction may not be completely finished, and when the duration time is longer than 20 minutes, a reaction-completed liquid and a reaction-uncompleted liquid may contact with each other while they flow through the pipe to cause increase in the particle sizes of the metal microparticles. In order to set the duration time to one minute or longer but 20 minutes or shorter, it is necessary to adjust the pipe length between the first mixing unit and the second mixing unit and the flow speed of a flowing liquid, and beside, it is important how continuously and effectively to remove a byproduct gas from a reaction liquid flowing through the pipe.

In the eleventh aspect according to the present invention, the producing unit for continuously producing metal microparticles according to any one of the first to tenth aspects further comprises a third mixing unit for adding a chelating agent solution and a reducing agent solution and mixing the solutions, which is installed in a stage after the second mixing unit or in the position between the gas-liquid separation unit and the second mixing unit.

The third mixing unit is installed so as to accelerate a reaction for continuously introducing dissimilar metal atoms into the crystal lattice of the metal microparticles formed in an early reaction, and completely finish the reaction. It may be decided on the basis of the particle sizes and monodispersibility of the produced metal microparticles of a multicomponent alloy, whether the third mixing unit is installed in a stage after the second mixing unit or in a position between the gas-liquid separation unit and the second mixing unit.

A twelfth aspect according to the present invention for achieving the above described object is a producing method for continuously producing metal microparticles by using a unit in any one of the first to eleventh aspects, the method for continuously producing metal microparticles formed of a multicomponent alloy by introducing dissimilar metal atoms into crystal lattices in a step of forming the metal microparticles and formed through an early reaction for forming the metal microparticles accompanied by the generation of a byproduct gas. Then, the twelfth aspect makes a production process of the metal microparticles formed of a multicomponent alloy accompanied by the generation of the byproduct gas continuous, can effectively remove the byproduct gas even in the continuous process to stabilize and uniformize the reaction, and thereby can stably produce the metal microparticles having small particle sizes, superior monodispersibility and a constant quality.

A thirteenth aspect according to the present invention is a metal microparticle produced by the producing method for producing metal microparticles of the twelfth aspect. A fourteenth aspect is a magnetic record medium having a magnetic layer containing the metal microparticle of the thirteenth aspect.

As described above, a method and a unit for continuously producing metal microparticles according to the present invention make a production process of the metal microparticles formed of a multicomponent alloy accompanied by the generation of a byproduct gas continuous, and can effectively remove the byproduct gas even in the continuous process to stabilize and uniformize a reaction.

Thereby metal microparticles having small sizes, superior monodispersibility and a constant quality can be stably produced. After all, if a method and a unit for continuously producing metal microparticles according to the present invention are applied to the production of metal microparticles contained in the magnetic layer of a magnetic record medium, they enable a continuous production and can improve the quality of the magnetic recording medium.

In the present invention, the term "microparticles" means particles containing nanoparticles. That is, size of "microparticles" is from nano-size to micro-size.

DETAILED DESCRIPTION OF THE PREFERRED EMBODIMENTS

Figure 1:
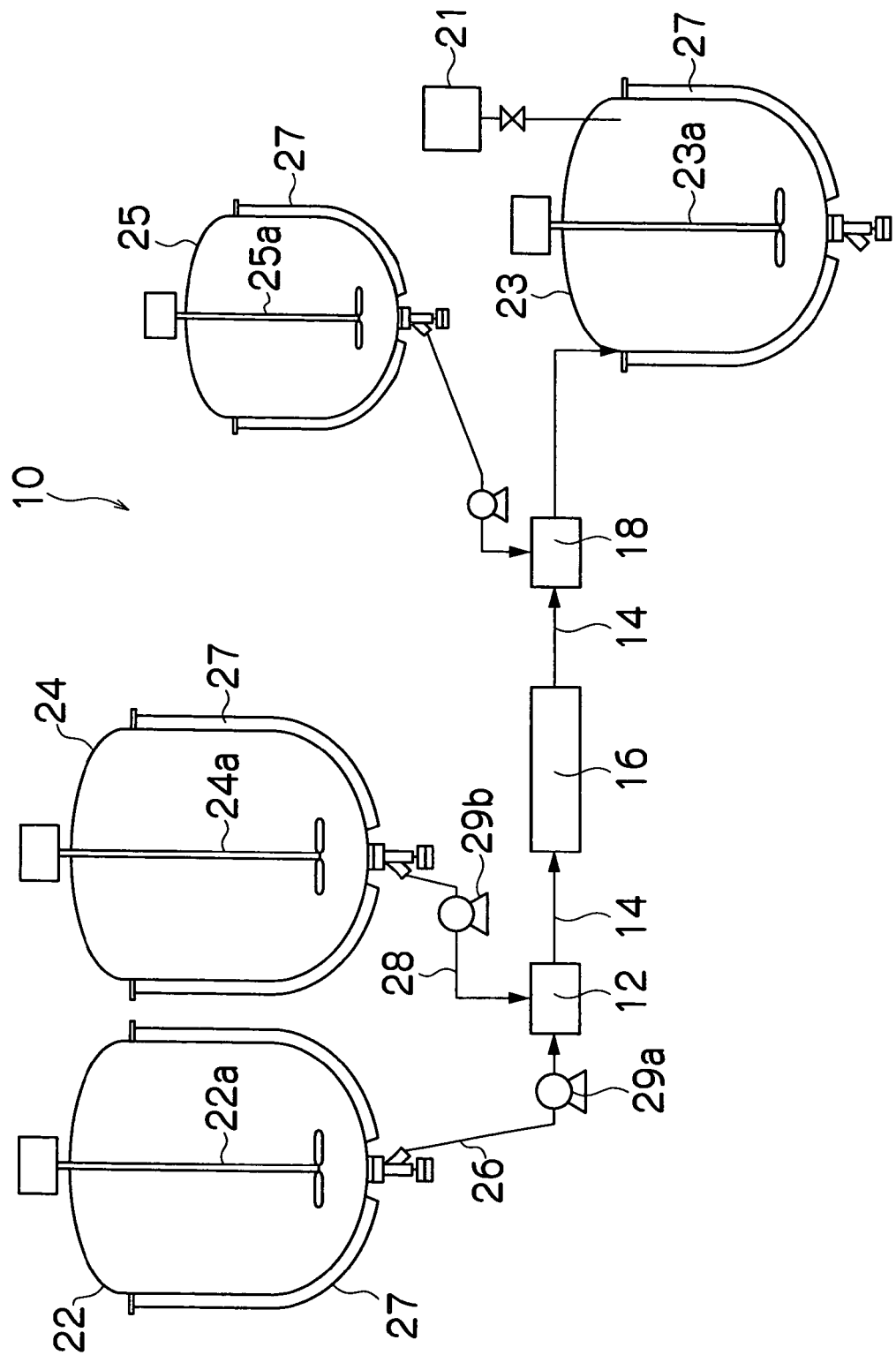
FIG. 1 is a schematic diagram showing the configuration of a continuous apparatus for producing metal microparticles according to the present invention.

Referring to the accompanying drawings, preferred embodiments of a method and a unit for continuously producing metal microparticles in relation to the present invention will be now described below.

A method and a unit for continuously producing metal microparticles according to the present invention relate to the production of the metal microparticles of a multicomponent alloy by a liquid-phase reaction method (a liquid-liquid reaction), and so far as the metal microparticles are produced through the early reaction of forming metal microparticles accompanied by the generation of a byproduct gas, can be applied to any method for producing metal microparticles. For instance, in the case of producing the metal microparticles contained in the magnetic layer of a magnetic record medium, preferably a usable first solution L1 and a usable second solution L2 mixed in the first mixing unit, and further the usable third solution L3 added and mixed in the second mixing unit include solutions described below.

For a first solution L1, a solution containing two or more metal ions selected from the group consisting of families 8, 9 and 10 in the periodic table is preferably used. Specifically, Fe, Pt, Co, Ni and Pd are preferable for the metal ions. For a second solution L2, a reducing agent solution can be preferably used. For the third solution L3, a solution containing one or more metal ions selected from the group consisting of families 11, 12, 13, 14 and 15 in the periodic table can be preferably used. Specifically, Cu, Ag, Au, Al, Zn and Sn are preferable for the metal ions.

As for the method of preparing a solution, a reversed micelle method is preferable among liquid-phase reaction methods, which can easily control the particle sizes of metal microparticles, and thus first to third solutions L1, L2 and L3 are preferably prepared into reversed micelle solutions by using a water-insoluble organic solvent containing a surface active agent. As for the surface active agent, an oil-soluble surface active agent is used. The oil-soluble surface active agent specifically includes a sulfonate type (for instance, aerosol OT (made by Wako Pure Chemical Industries, Ltd.)), a quaternary ammonium salt-type (for instance, cetyltrimethylammonium bromide), and an ether type (for instance, pentaethyleneglycol dodecylether). In addition the water-insoluble organic solvent for dissolving the surface active agent includes an alkane, an ether and an alcohol. The alkane preferably includes alkanes having 7 to 12 carbon atoms, and specifically is heptane, octane, iso-octane, nonane, decane, undecane, dodecane or the like. The ether is preferably diethyl ether, dipropyl ether, dibutyl ether or the like. The alcohol is preferably ethoxyethanol, ethoxypropanol or the like. In addition, as for a reducing agent in a reducing agent solution, a compound including alcohols; polyalcohols; $H_2$; HCHO, $S_2O_6^{2-}$, $H_2PO_2^-$, $BH_4^-$, $N_2H_5^+$, $H_2PO_3^-$ or the like can be singly used, but two or more compounds are preferably concomitantly used.

FIG. 1 is a schematic block diagram of a unit 10 for continuously producing metal microparticles according to the present invention, and the example with the use of a solution for producing the metal microparticles of a multicomponent alloy contained in the magnetic layer of a magnetic record medium will be now described below.

As shown in FIG. 1, a unit 10 for continuously producing metal microparticles according to the present invention mainly comprises the first mixing unit 12 for continuously supplying and mixing first and second solutions for carrying out the early reaction accompanied by a byproduct gas; the second mixing unit 18 for continuously supplying the third solution to the reaction liquid containing the metal microparticles formed in the early reaction and for mixing the two solutions, to introduce dissimilar metal atoms into the crystal lattices of the metal microparticles; and a gas-liquid separation unit 16 which is installed on the way of the pipe 14 for connecting the first mixing unit 12 with the second mixing unit 18, and which continuously removes the byproduct gas generated with the proceeding of the early reaction.

first and second solutions L1 and L2 are separately prepared in a first preparation tank 22 and a second preparation tank 24 arranged in the vicinity of the first mixing unit 12. Specifically, in the first preparation tank 22, a water-insoluble organic solvent containing a surface active agent and a metal salt aqueous solution containing two or more metal ions selected from the group consisting of families 8, 9 and 10 in the periodic table are mixed with a stirrer 22a to prepare the reversed micelle solution of the first solution L1. In the second preparation tank 24, the water-insoluble organic solvent containing the surface active agent and a reducing agent aqueous solution are mixed with a stirrer 24a to prepare the reversed micelle solution of the second solution L2. In addition, on each periphery of the first and second preparation tanks 22 and 24, heating jackets 27 are installed to heat the tanks to an appropriate temperature for an early reaction.

In addition, the third solution is prepared in the third preparation tank 25 arranged in the vicinity of the second mixing unit 18. Specifically, a water-insoluble organic solvent containing a surface active agent and a metal salt aqueous solution containing one or more metal ions selected from the group consisting of families 11, 12, 13, 14 and 15 in the periodic table are mixed with a stirrer 25a to prepare the reversed micelle solution of the third solution L3.

First and second solutions L1 and L2 prepared in first and second preparation tanks 22 and 24 are supplied to the first mixing unit 12 with feed pumps 29a and 29b through respective feed pipes 26 and 28. In the first mixing unit 12, the two solutions L1 and L2 are instantly mixed, and the mixed solution is immediately discharged from the first mixing unit 12 and supplied to a gas-liquid separation unit 16 through a pipe 14. An early reaction proceeds in the pipe 14 to continuously generate a byproduct gas with the proceeding of the reaction. As described above, in the case of a flow system reaction in which the solutions for chemical reaction are mixed in the mixing unit, and the reaction proceeds in the pipe 14 connected to the mixing unit, it is very important to stabilize the flow of a reaction liquid flowing through the pipe 14 by stably removing the byproduct gas continuously generated with the proceeding of the reaction, and thereby to stabilize and uniformize the reaction. By the stabilization and uniformization of the reaction, metal microparticles having fine sizes and preferable monodispersibility can be produced. In the gas-liquid separation unit 16, the metal microparticle-forming reaction ends while the byproduct gas continuously generated with the proceeding of the reaction is continuously and efficiently removed. In this case, in order to reliably remove the byproduct gas continuously generated with the proceeding of the reaction in the gas-liquid separation unit 16, it is necessary for the pipe 14 to have enough length to finish the early reaction started by mixing of the two solutions in a mixing unit 12 before the mixed solution reaches the second mixing unit 18, and furthermore, more preferably to have the length to finish the reaction before the mixed solution reaches a gas-liquid separation unit 16. The second mixing unit 18 continuously adds the third solution L3 to a reaction liquid LM degassed in the gas-liquid separation unit 16 and mixes them, to continuously introduce (dope) dissimilar metal atoms to the crystal lattices of the metal microparticles formed in the early reaction. Thereby, the metal microparticles of a multicomponent alloy are produced. In this case, in a stage after the second mixing unit 18 or in a point between the gas-liquid separation unit 16 and the second mixing unit 18, a mixing tank 23 is preferably installed for adding and mixing the fourth solution L4 containing a chelating agent solution mixed with a reducing agent solution to a liquid mixture mixed in the second mixing unit 18.

FIG. 1 shows an embodiment where the third mixing tank 23 is installed in a stage after the second mixing unit 18. Taking FIG. 1 as an example for explanation, a liquid mixture mixed in the second mixing unit 18 is collected into a mixing tank 23, the third solution is added from an addition tank 21, then after about 5 minutes, the mixture is heated to about 40° C. while being slowly stirred with a stirrer 23a, and subsequently a fourth solution L4 is added to the mixture and is aged for 120 minutes. With the above step, doping in the second mixing unit 18 is finished. In addition, on each perimeter of the third preparation tank 25 and a mixing tank 23, heating jackets 27 are installed, and the tanks are heated to an appropriate temperature.

Subsequently, a structure of the first and second mixing units 12 and 18 preferably used in a unit 10 for continuously producing metal microparticles according to the present invention, will be described.

A mixing unit used in the present invention preferably can instantly mix solutions in a mixing field, and immediately discharge a reaction liquid LM which reacts by mixing, without staying it in the mixing field, in order to form metal microparticles having fine sizes and adequate monodispersibility; and preferably includes such mixing units as a high-speed stirring and mixing type, a narrow-gap mixing type and a high-pressure mixing type. These types of mixing units may be used for any one of the first and second mixing units 12 and 18, or the combination of these types of mixing units may constitute the first and second mixing units 12 and 18. The embodiments, in which these mixing units applied to the first mixing unit 12, will be now described below.

(1) High-Speed Stirring and Mixing Type

Figure 2:
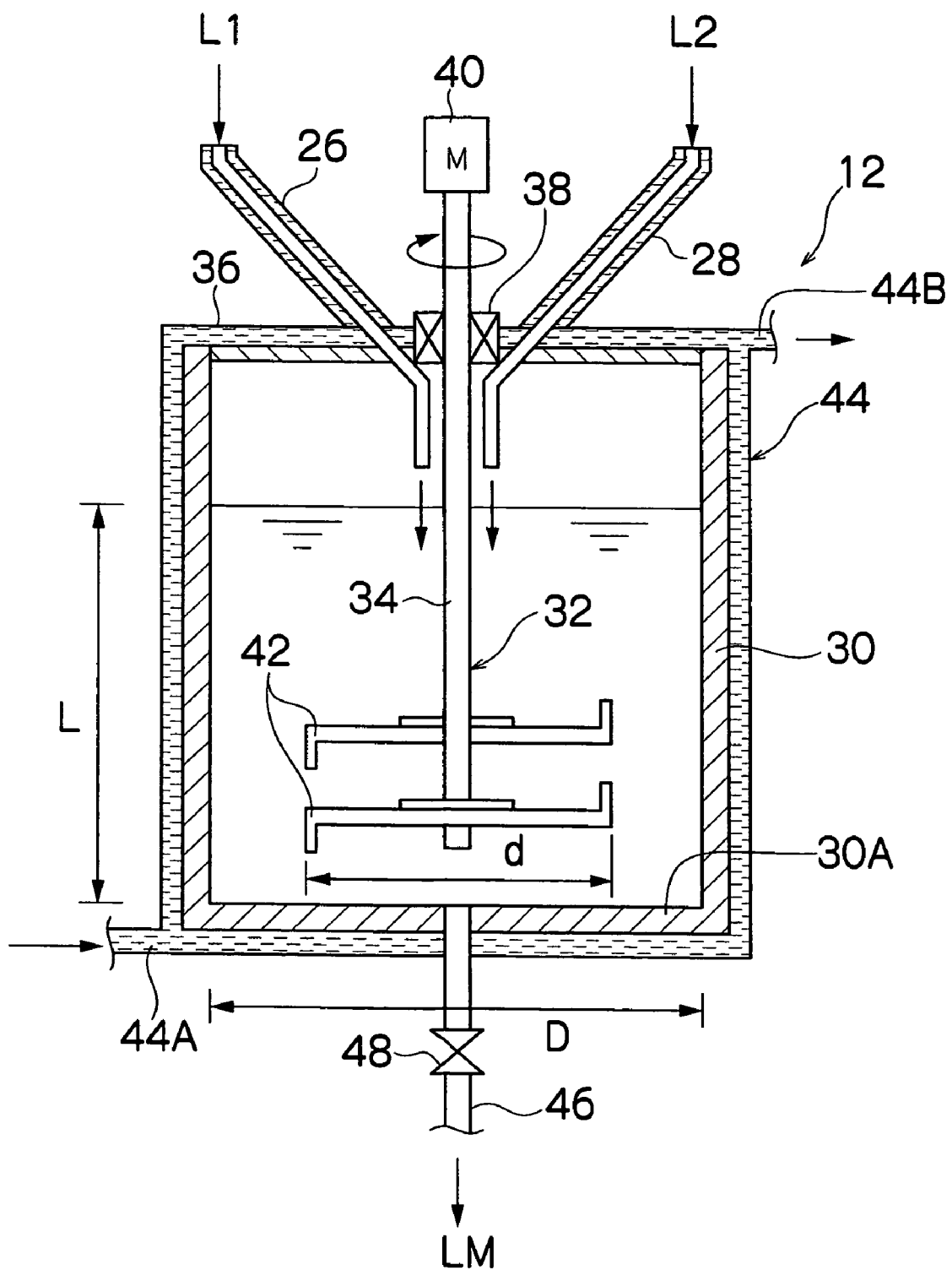
FIG. 2 is a sectional view showing a mixing unit of a high-speed stirring and mixing type.

FIG. 2 is a sectional view of a mixing unit 12 of a high-speed stirring and mixing type.

As is shown in FIG. 2, a mixing unit 12 is formed into a cylindrical vessel shape and comprises a narrow mixing vessel 30 having a retention time of 10 seconds or shorter, and a high-speed stirrer 32 installed therein. The high-speed stirrer 32 has the top part of its vertical rotating shaft 34 rotatably supported on the closure plate 36 of the mixing vessel 30 through a bearing 38, and to the upper end of the rotating shaft 34, a motor 40 fixed to the pedestal which is not shown is connected. In addition, in the lower end of the rotating shaft 34, two stages of edge turbulent type stirring blades 42 and 42 in the top and the bottom are installed so as to be immersed in a liquid. The spacing between the stirring blades 42 is preferably in a range of 1.0 d to 0.5 d, when the diameter of the stirring blade 42 is defined as d. In addition, the minor diameter D of the mixing vessel 30 is preferably in a range of D=1.7 d to 3.7 d with respect to the diameter d of the stirring blade 42. Furthermore, the depth L of the static liquid in the mixing vessel 30 is preferably in a range of 2 d to 3 d. In addition, in FIG. 2, the type of the stirring blade 42 is shown as an edge turbine type, but a dissolver type, a paddle type, a propeller type and a flat disk type can be used, and further a turbine type and disc turbine type can be also used. Even when any type of a stirring blade 42 is used, the high speed stirrer 32 has such a structure as to make peripheral velocity at the top of the stirring blade 42 to be preferably 5 m/second or longer, and further preferably 10 m/second or longer.

In the periphery of a mixing vessel 30, a jacket 44 through which a heating medium having comparatively large heat capacity, such as water and oil, is wound, and a heat medium inlet 44A and a heat medium water outlet 44B of the jacket 44 are connected to a heat medium-feeding device which is not shown. A first solution L1 is supplied from the previously described first preparation tank 22 through a feed pipe 26, and a second solution L2 is supplied from the second preparation tank 24 through a feed pipe 28. In this case, the top of each of feed pipes 26 and 28 penetrates the top board 36 of the mixing vessel 30, and is extended preferably to the vicinity of a liquid level along a rotating shaft 34 of a high-speed stirrer 32. In addition, an outlet duct 46 for a reaction liquid LM is connected to the base plate 30A of the mixing vessel 30, and a valve 48 is installed on the way of the outlet duct 46.

In the mixing unit 12 of a high-speed stirring and mixing type having the above described configuration, a mixing vessel 30 receives a predetermined quantity of a first solution L1 prepared in a first preparation tank 22 and supplied through a feed pipe 26, and then a high-speed stirrer 32 starts high-speed stirring so as to make a circumferential speed at the tip of the stirring blade 42 to be 5 m/second or longer, and preferably 10 m/second or longer. Subsequently, a second solution L2 is added from a second preparation tank 24 to the first solution L1 in the mixing vessel 30 through a feed pipe 28. In the above step, the temperatures of the solutions L1 and L2 and the temperature in the mixing unit 12 are set to predetermined temperatures suitable for an early reaction by which metal microparticles with a crystal structure are formed. Under an appropriate mixture reaction temperature condition thus prepared, the first solution L1 in the mixing vessel 30 has an extremely strong slewing flow formed into a V-shape around a rotating shaft 34 which convolutes the solution from a liquid level toward the bottom, and then the second solution L2 added to the vicinity of the rotating shaft 34 is instantly convoluted into the first solution L1 by the slewing flow forming a V-shape, and is uniformly dispersed in the whole first solution L1 in the mixing vessel 30. The reaction liquid LM is mixed and reacts in the mixing vessel 30, and is promptly discharged from an exhaust pipe 46. The residence time in the mixing vessel 30 is preferably 10 seconds or shorter. Thereby, the metal microparticles having fine sizes and preferable monodispersibility are formed. As for the order, the second solution L2 may be charged in the mixing vessel 30 at first, and then the first solution L1 may be charged.

Figure 3:
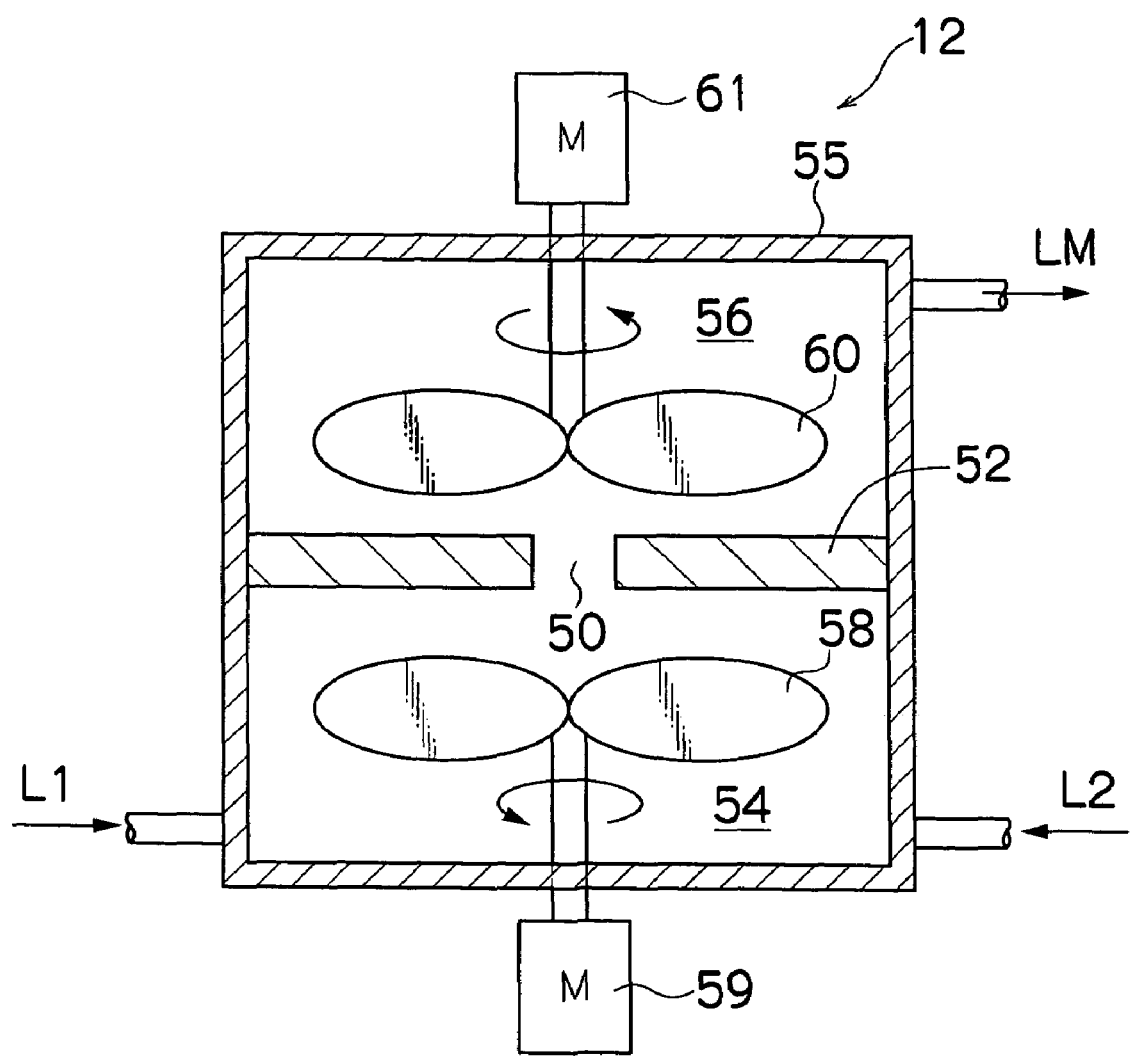
FIG. 3 is a sectional view showing another aspect of a mixing unit of a high-speed stirring and mixing type.

FIG. 3 shows another aspect of a high-speed stirring and mixing type of a mixing unit 12. Specifically, a narrow mixing vessel 55, which gives a solution a residence time of 10 seconds or shorter, is separated into two mixing chambers 54 and 56 with a partition plate 52 having a communicating port 50. In the mixing chambers 54 and 56, stirring blades 58 and 60 are respectively installed and stir the solution at high speed with motors 59 and 61 so as to make circumferential speeds at the tips to be 5 m/second or higher, and preferably 10 m/second or higher. In the case of the mixing unit 12, first and second solutions L1 and L2 are supplied to one mixing chamber 54 at first, and are stirred and mixed with the stirring blade 58 at high speed, and then, the mixed solution flows into another mixing chamber 56 through the communicating port 50, is further stirred and mixed at high speed with the stirring blade 60, and then is discharged. In the case of the mixing unit 12 of a high-speed stirring and mixing type in FIG. 3, because a mixed liquid immediately moves to each of the mixing chambers 54 and 56 without staying, the first and second solutions L1 and L2 are instantly mixed and the reaction liquid LM that reacts by mixing can be immediately discharged. Thereby, metal microparticles having fine sizes and preferable monodispersibility are formed.

In addition, a mixing unit 12 for conducting a high-speed stirring method is not limited to the mixing units in FIGS. 2 and 3, but has only to have a structure which can accommodate first and second solutions L1 and L2 in a mixing vessel 30, mix and react them with a liquid-phase reaction method, and make a circumferential speed at the tip of a stirring blade 42 to be 5 n/second or higher.

(2) Narrow-Gap Mixing Type

Figure 4:
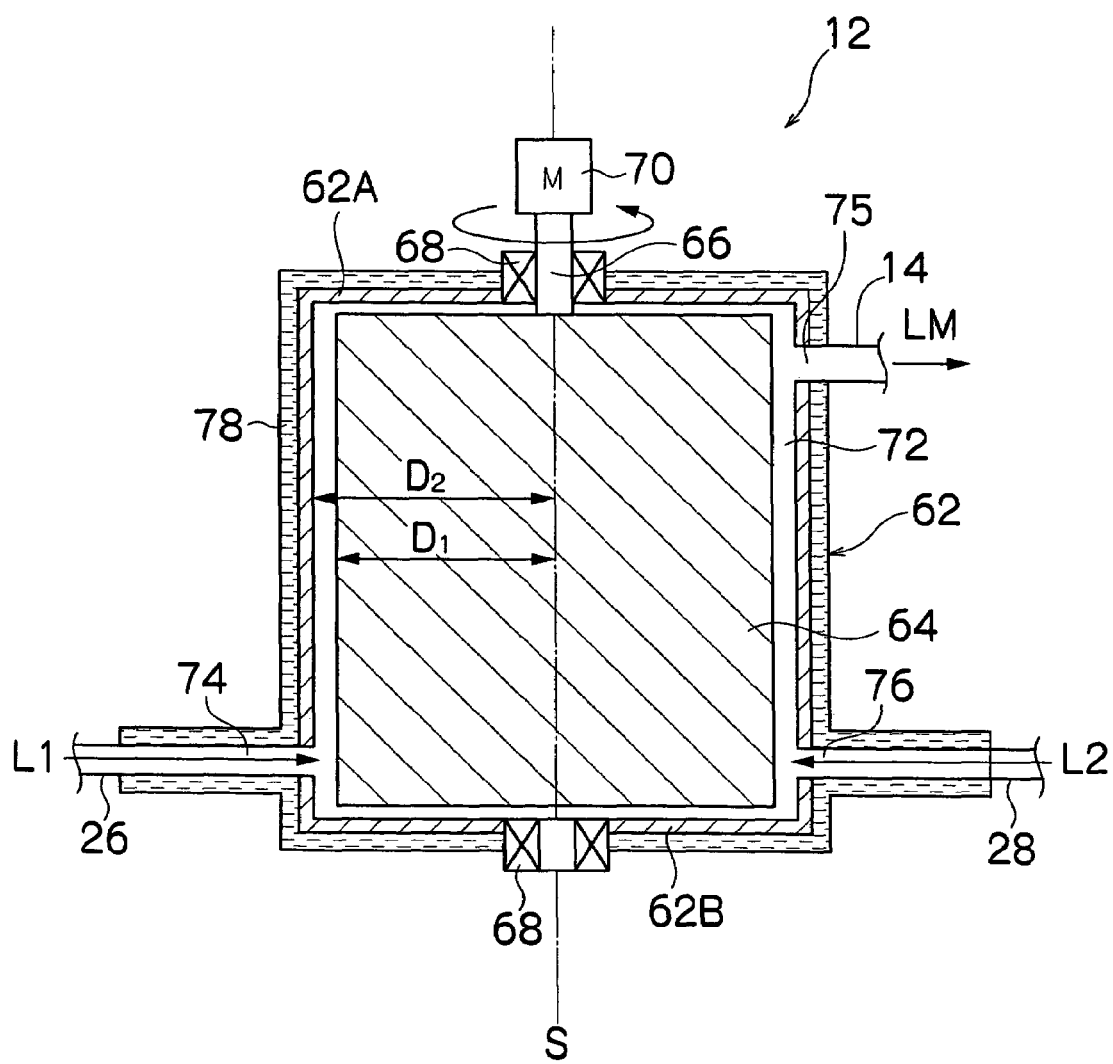
FIG. 4 is a sectional view showing a mixing unit of a narrow-gap type.

FIG. 4 is a sectional view of a mixing unit 12 of a narrow-gap mixing type.

As shown in FIG. 4, a mixing unit 12 has a cylindrical rotatable drum 64 with a slightly smaller diameter than the minor diameter of a mixing vessel 62, installed in the vertical mixing vessel 62 with the shape of a cylindrical vessel having the top and bottom sealed. The rotatable drum 64 has an upright rotating shaft 66 along a rotation center S, and the upper and lower parts of the rotating shaft 66 are rotatably supported on the top board 62A and the bottom plate 62B of the mixing vessel 62 through bearings 68 and 68. In addition, to the upper end of the rotating shaft 66, a motor 70 fixed to the pedestal which is not shown, is connected.

Between the internal circumferential wall face of a mixing vessel 62 and the outer circumferential face of a rotatable drum 64, a ring-shaped narrow-gap 72 is formed. The ring-shaped narrow-gap 72 can be formed by such a setting that when a distance D1 between a rotation center S and a top of the rotatable drum 64 is supposed to be 1, a distance D2 between the rotation center S of the rotatable drum 64 and the closest inner wall of the mixing vessel 62 is in a range of 1.001 to 1.200. In addition, on both sides of the lower end of the mixing vessel 62, a supply port 74 for a first solution L1 and a supply port 76 of a second solution L2 are formed, and each of the supply ports 74 and 76 is respectively connected to each of feed pipes 26 and 28. In addition, on the upper end side of a mixing vessel 62, an exhaust port 75 for a reaction liquid LM is formed and connected to a pipe 14. Around the periphery of a mixing vessel 62, a jacket 78 for passing a heating medium with a comparatively large heat capacity such as water and oil therein, is wound.

In the mixing unit 12 of a narrow-gap mixing type, preferably, width of a gap is from 10 µm to 10 mm. More preferably, width of a gap is from 0.1 mm to 5 mm.

When the mixing unit 12 of a narrow-gap mixing type configured as described above is employed, first and second solutions L1 and L2 are supplied into the narrow-gap 72 of a mixing vessel 62, under an appropriate mixture reaction temperature condition, in a state that a rotatable drum 64 rotates at such an ultra-high speed as to make a circumferential speed at the tip (the top circumferential position) to be 5 m/second or higher, and preferably 10 m/second or higher. The solutions L1 and L2 supplied into the narrow-gap 72, while receiving a uniform shearing force from the internal circumferential wall face of the fixed mixing vessel 62 and the outer circumferential face of the rotatable drum 64 rotating at an ultra-high speed, helically moves from the lower end to the upper end of the mixing vessel 62 inside the narrow-gap 72, then reaches a exhaust port 75, and is discharged to a pipe 14. Because the first and second solutions L1 and L2 can be thus instantly and effectively mixed in the narrow-gap 72, metal microparticles are formed so as to acquire fine sizes and superior monodispersibility. In the above description, when the above described distance D2 is too small as smaller than 1.001, the small distance causes ununiformity of a shearing force due to the effect of surface roughness on the internal circumferential wall face of the mixing vessel 62 and the outer circumferential face of the rotatable drum 64, and thereby makes the monodispersibility of the formed metal microparticles inferior. On the contrary, when the distance D2 is too long as larger than 1.200, the large distance causes a small shearing force given to the solutions L1 and L2, and makes the particle sizes of the formed metal microparticles easily large, and also the monodispersibility easily inferior.

Figure 5:
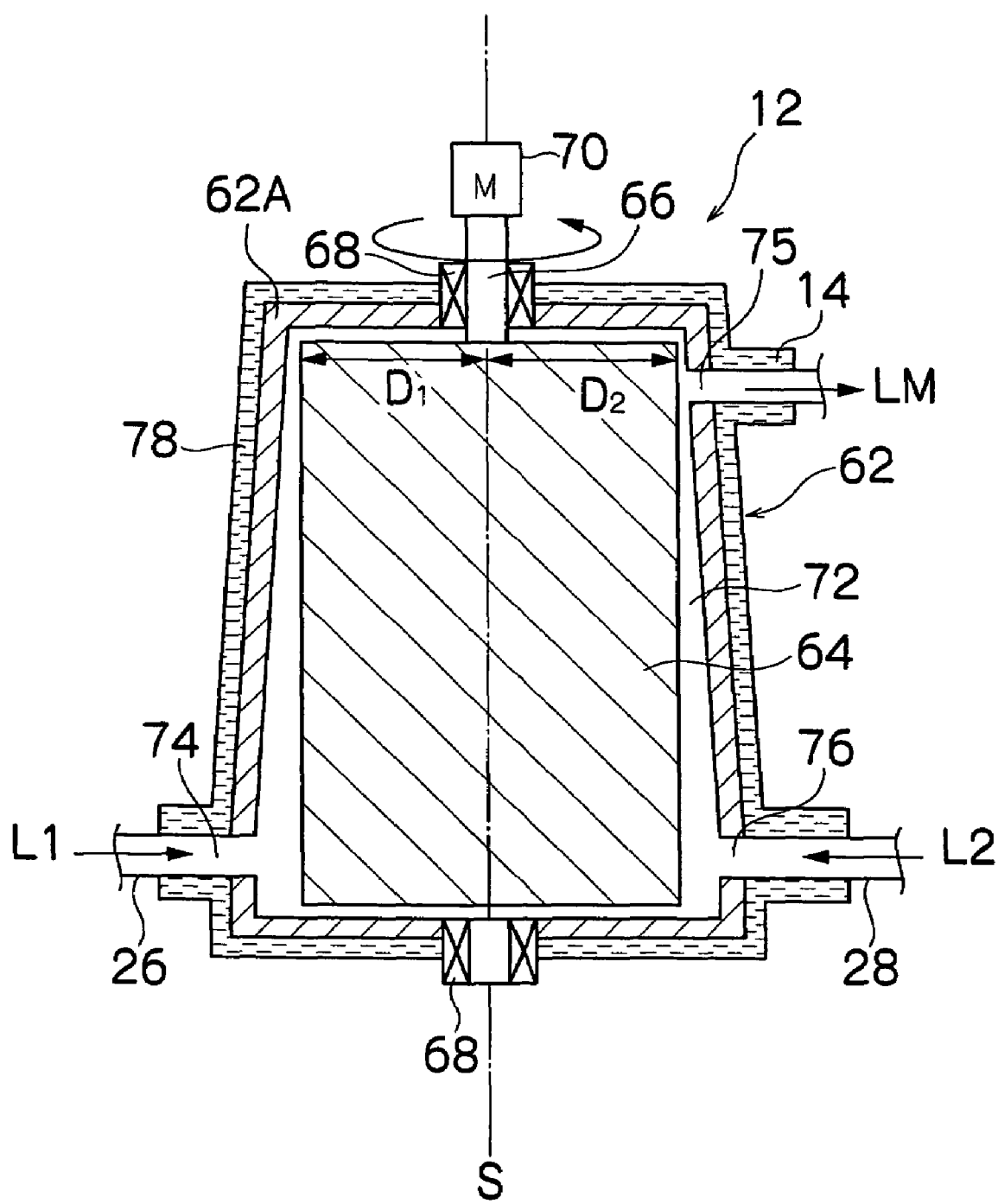
FIG. 5 is a sectional view showing another aspect of a mixing unit of a narrow-gap type.

FIG. 5 is a sectional view showing another aspect of the mixing unit 12 of a narrow-gap mixing type, and the same reference numeral will be put on the same member as in FIG. 4 for explanation.

As shown in FIG. 5, a mixing unit 12 is composed so as to make the inner wall diameter of a mixing vessel 62 get smaller with respect to the major diameter of a rotatable drum 64 as going up to the upper end from the lower end of a mixing vessel 62, and a narrow-gap 72 narrowed as going up to the upper end from the lower end of the mixing vessel 62. When such a mixing unit 12 is employed, first and second solutions L1 and L2 supplied into the narrow-gap 72 get a faster flow rate as the solutions move to the upper end from the lower end of the mixing vessel 62, so that the shearing force given to the first and second solutions L1 and L2 can be slowly increased. Thereby, metal microparticles having fine sizes and superior monodispersibility can be formed. In the above mixing unit, a distance D1 between a center and a top of a rotatable drum 64, and a distance D2 from the rotation center S of the rotatable drum 64 to the closest inner wall of the mixing vessel 62 are the dimension at the upper end position of the mixing vessel 62 as shown in FIG. 5.

Figure 6:
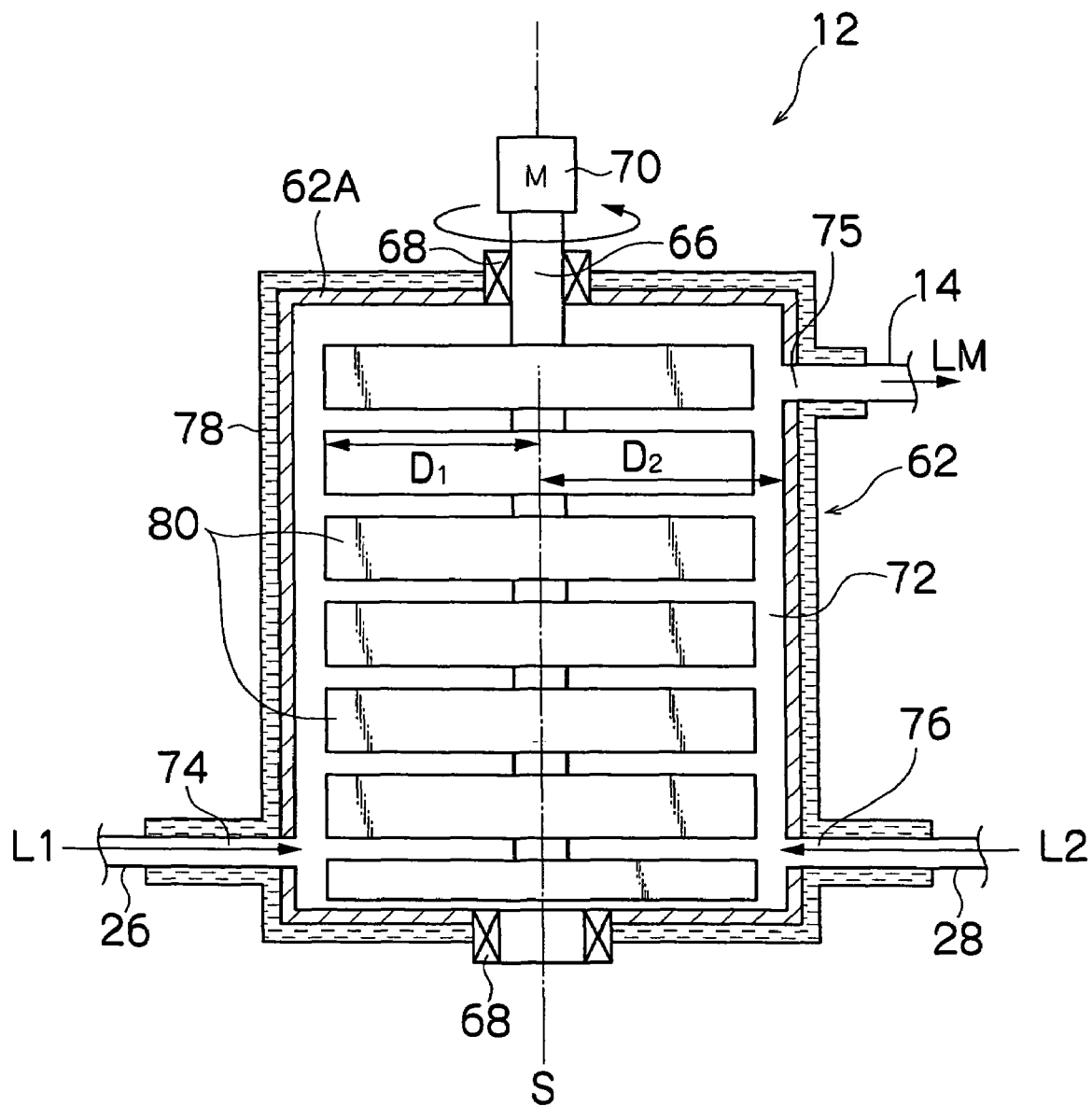
FIG. 6 is a sectional view showing further another aspect of a mixing unit of a narrow-gap type.

FIG. 6 is a sectional view which shows further different aspect of the mixing unit 12 of a narrow-gap mixing type, and the same reference numeral is put on the same member as in FIG. 4 for explanation.

As shown in FIG. 6, a mixing unit 12 has a plurality of disc-shaped flat disks 80, 80 and so on, in place of a rotatable drum 64 arranged around a rotating shaft 66 at a predetermined spacing. In this case, a distance between adjacent flat disks 80 is preferably equal to the narrow-gap 72 which is formed between the outer peripheral surface of the flat disk 80 and the internal circumferential wall face of a mixing vessel 62. Thereby, metal microparticles having small particle sizes and superior monodispersibility can be formed.

In addition, the mixing unit 12 of a narrow-gap mixing type is not limited to FIGS. 4, 5 and 6, but has only to be a unit having the narrow-gap 72 formed between the inner wall of a mixing vessel 62 and the stirring members 64 and 80 which rotate at a high speed, and having such a setting that when a distance between the rotation center S and the top of the stirring members 64 and 80 is supposed to be 1, a distance between the rotation center S of the stirring members 64 and 80 and the closest inner wall is in a range of 1.001 to 1.200, in order to form the narrow-gap 72, and to have such a structure as to supply first and second solutions L1 and L2 into the narrow-gap 72 and mix them and discharge a mixed reaction liquid LM from the narrow-gap 72.

(3) High-Pressure Mixing Type

As for the types of a high-pressure mixing type, a one-jet type, T-shaped and Y-shaped types and a two-jet facing type can be preferably used. These types will be described below, with reference to the example which are applied to the first mixing unit 12.

a) One-Jet Type

Figure 7:
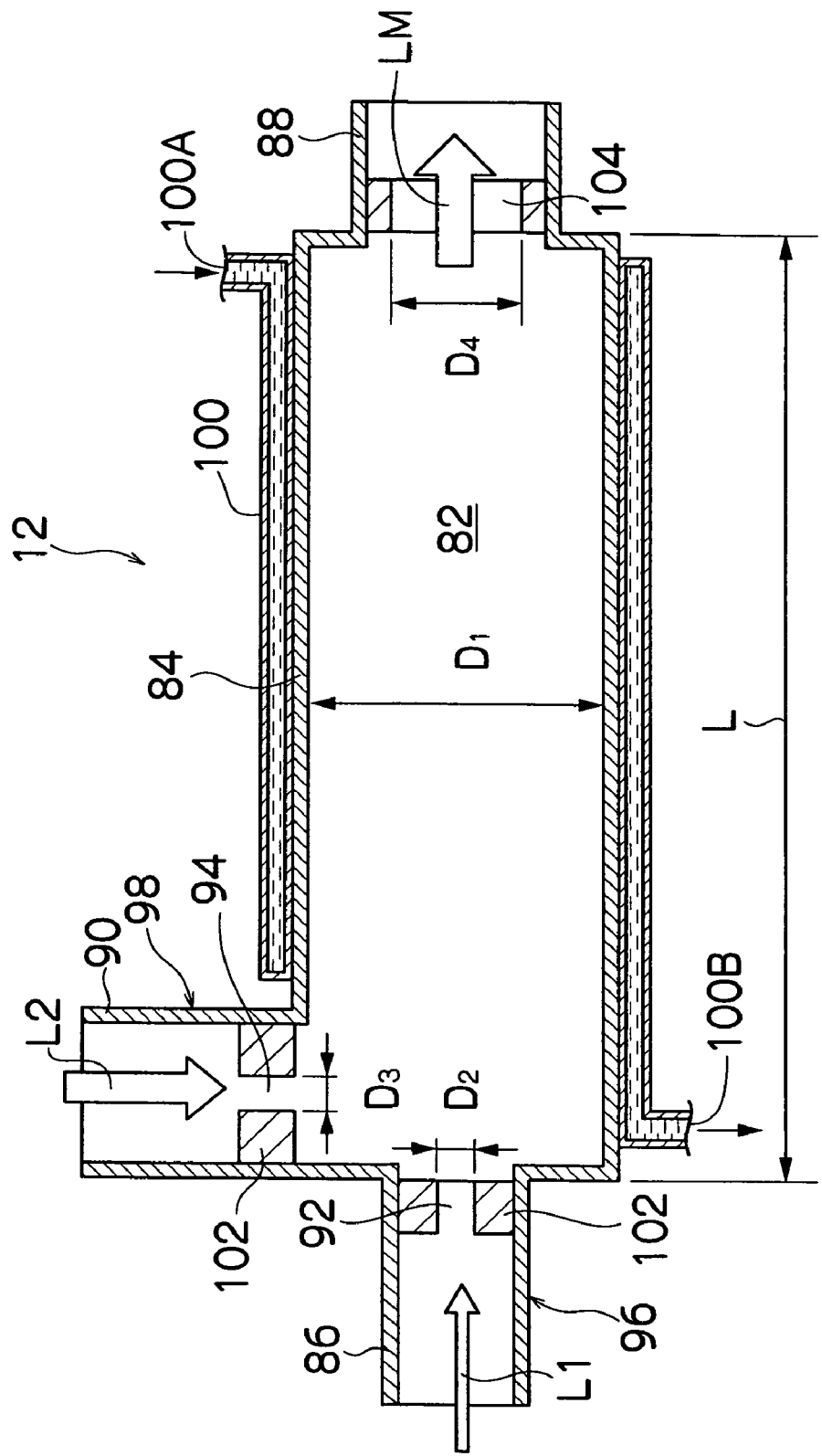
FIG. 7 is a sectional view showing a mixing unit of a high-pressure mixing method of a one-jet type.

FIG. 7 is a sectional view showing a concept of a one-jet type mixing unit 12.

As shown in FIG. 7, a mixing unit 12 comprises a mixing vessel 84 having a cylindrical mixing chamber 82 (a mixing field) formed therein for mixing and reacting first and second solutions L1 and L2 therein, a first conduit 86 for introducing the first solution L1 into the mixing chamber 82, which is connected to an opening at one-end side of the mixing vessel 84, and an outlet duct 88 for discharging a reaction liquid mixed and reacted in the mixing chamber 82, which is connected to the other opening at the other end side of the mixing vessel 84. In addition, to the part on the peripheral surface of the mixing vessel 84 and close to the outlet of the first conduit 86, a second conduit 90 for introducing the second solution L2 into the mixing chamber 82 is connected. In the top inner parts of the first conduits 86 and the second conduits 90, a first orifice 92 and a second orifice 94 are respectively formed, and thereby, in the first conduits 86 and the second conduits 90, a first nozzle 96 and a second nozzle 98 are formed so as to jet a turbulent liquid. In FIG. 7, the first solution L1 is introduced from the first conduit 86, and the second solution L2 is introduced from the second conduit 90, but each liquid can be introduced from a reverse conduit. In addition, an outlet duct 88 may be connected to the side part of the mixing vessel 84, so far as the side part is close to the other end side of the mixing vessel 84.

In addition, on the periphery of the mixing vessel 84, a jacket 100 for passing a heating medium with comparatively high heat-capacity such as water and oil, is wound, and a heat medium inflow entrance 100A and a heat medium water outlet 100B of the jacket are connected to a heat-medium-feeding device which is not shown. A mixture reaction temperature is preferably set appropriately to a predetermined temperature suitable for early reaction according to the types of first and second solutions L1 and L2.

As for a method for drill-working first and second orifices 92 and 94 of block orifice materials 102, the methods well-known as working methods for precisely boring an exhaust nozzle with a diameter of about 100 μm in the orifice materials 102 such as metal, ceramic and glass, can be preferably used. The well-known methods include micro cutting working, micro grinding, blasting, micro electric discharge machining, a LIGA method, laser beam machining and SPM working.

A material for the orifice material 102 has preferably a superior workability and has hardness close to diamond. Accordingly, the preferably usable materials include, aside from diamond, various metals and metal alloys which are hardened by quenching, nitriding, sintering or the like. In addition, ceramic can be also preferably used, because of having high hardness and superior workability to diamond. In addition, in the present embodiment, a throttle structure of first and second nozzles 96 and 98 is described by taking an orifice as an example, but so far as the throttle structure has a function for jetting a turbulent liquid, any other device can be used without being limited to the orifice.

In the mixing unit, a first conduit 86 and a second conduit 90 have a compressing device which is not shown, through which a first solution L1 and a second solution L2 are compressed and supplied to the first and second nozzles 96 and 98. However, the pressure for sprouting the solution from the second nozzle 98 into a mixing chamber 82 is controlled smaller than the pressure of the high-pressure jet flow which jets out from the first nozzle 96 to the mixing chamber 82. As for the compressing device for applying a high pressure to a liquid, various devices are known and any one can be used, but a reciprocating pump such as a plunger pump and a booster pump are preferably used, because they are comparatively available and inexpensive. In addition, though a rotary pump cannot generate such a high pressure as the reciprocating pump, a high-pressure generation type of the rotary pump may be used.

Then, a first solution L1 is sprouted to a mixing chamber 82 from a first nozzle 96 in the form of a jet flow at a high pressure of 1 MPa or higher and a turbulent flow with the Reynolds number of 10,000 or more when flowing into the mixing chamber 82, and a second solution L2 having a lower pressure than the first solution L1 is sprouted from a second nozzle 98 to the mixing chamber 82, as a cross flow almost perpendicular to the first solution L1. In this case, even if the second solution L2 is not perpendicular to the first solution L1 precisely at an angle of 90 degree, the second solution L2 has only to contain a perpendicular velocity vector component as the main component. Thereby, the first and second solutions L1 and L2 are instantly and effectively mixed under an appropriate mixture reaction temperature condition, and a reaction liquid LM that reacts by mixing is immediately discharged from an exhaust pipe 88 to a pipe 14. As a result, metal microparticles having fine sizes and adequate monodispersibility are formed.

Figure 8:
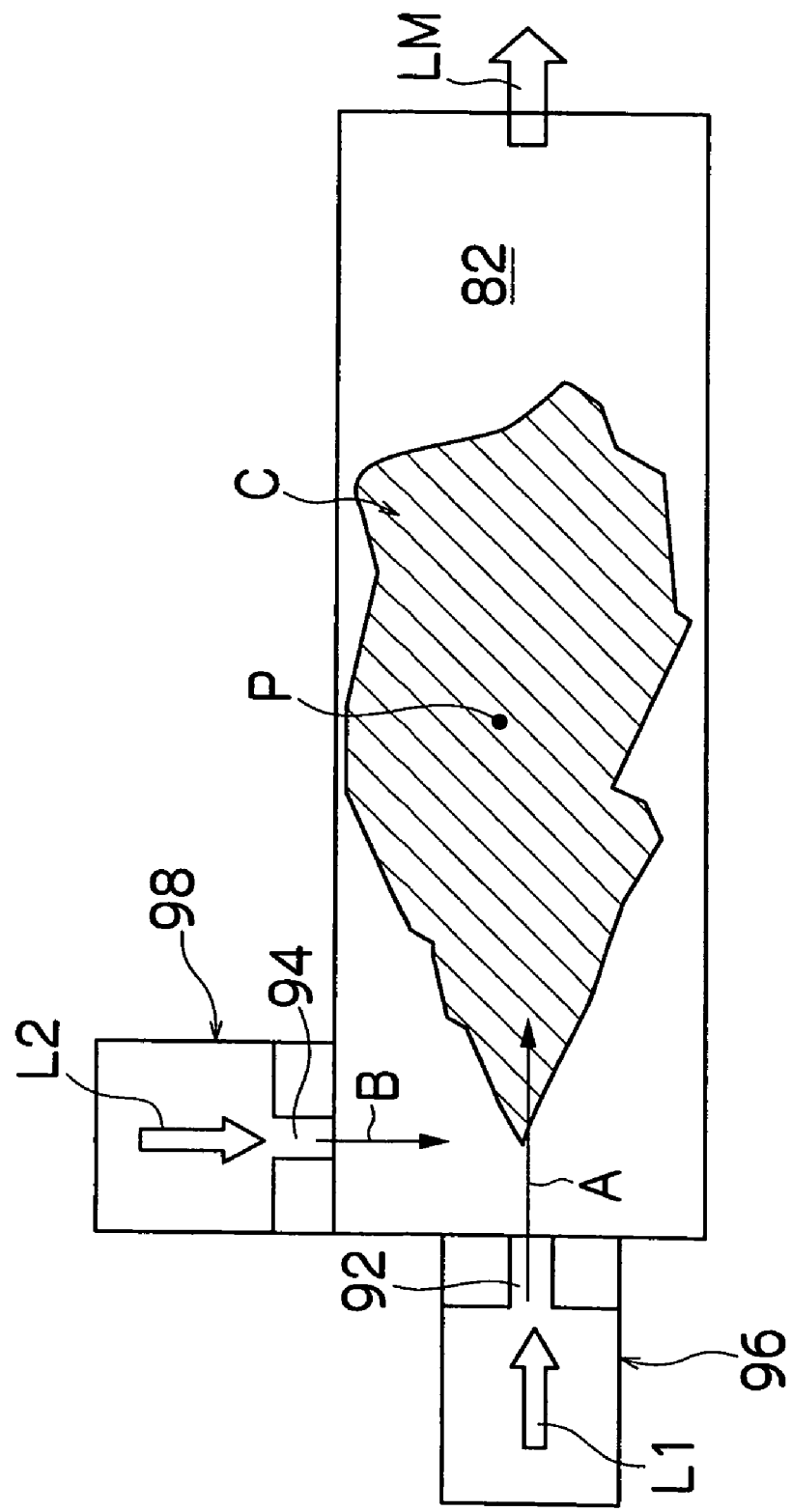
FIG. 8 is an explanatory drawing for explaining a mixing theory for a high-pressure mixing method of a one-jet type.

The mixture reaction, as is schematically shown in FIG. 8, utilizes high eddy viscosity generated when the first solution L1 of a turbulent jet flow with a high speed and a high pressure convolutes the second solution L2 sprouted from an almost perpendicular direction to the first solution L1 so as to be accompanied by the second solution L2, and the first and second solutions L1 and L2 are mixed to obtain a high mixing efficiency, so that the above described mixing chamber 82, first and second nozzles 96 and 98 and exhaust pipe 88 of the mixing unit 12 are formed so as to have the relation described below.

Specifically, because eddy viscosity is necessary to be formed in a mixing chamber 82 as is shown in FIG. 7, a cylinder diameter D1 is formed so as to be larger than an orifice diameter D2 of a first nozzle 96 and an orifice diameter D3 of a second nozzle 98. Because the eddy viscosity particularly produced by a first solution L1 of a straight flow A is important for increasing a mixing efficiency, the dimension ratio of the cylinder diameter D1 of the mixing chamber 82 to the orifice diameter D2 of the first nozzle 96 is preferably in a range of 1.1 to 50, and further preferably 1.1 to 20. In addition, in order to make a second solution L2 of a cross flow B perpendicular to the straight flow A easily convoluted in the solution L1 of the straight flow A, the pressure of the cross flow B is preferably decreased below the pressure of the straight flow A to make a spouting speed of flow equal to that of the straight flow A or less. Specifically, the ratio of the spouting speed of the cross flow B to that of the straight flow A is preferably 0.05 to 0.4, and further preferably 0.1 to 0.3.

In addition, a cross flow B is necessary to be sprouted to a mixing chamber 82 before the position in which eddy viscosity C formed by the straight flow A which is sprouted from the first nozzle 96 with a small diameter to the mixing chamber 82 having a larger diameter than it, is maximized, and consequently a second nozzle 98 is necessary to be placed at a position between the first nozzle 96 and the position of the maximum eddy viscosity C. Accordingly, it is necessary to know the position in which the eddy viscosity C is maximized. The position in the mixing chamber 82, in which the eddy viscosity C is maximized can be grasped by previously performing a simulating calculation with the use of the numerical analysis software RFLOW made by Rflow Co., Ltd., which has been already on the market as a flow analysis software in Japan and is known well as the flow analysis software. In this case, as can be seen from FIG. 8, the position of allowing the eddy viscosity C maximized is not a pinpoint but has a region, so that the position of allowing the eddy viscosity C maximized has only to be determined as a point P of an almost central position of the eddy viscosity C. Accordingly, the second nozzle 98 is preferably positioned in the front of the point P, but the position of the second nozzle 98 is more preferably determined so that the crossing flow B can be sprouted at an early stage of forming the eddy viscosity C.

In addition, as a result of analysis with the use of the above described numerical analysis software, it was found that the central point P of the region where eddy viscosity C appears has a relationship to the flow rate of a straight flow A, and approximately matches the position in which the maximum flow rate (normally a flow rate at the first nozzle position) of the straight flow A is lowered to $\frac{1}{10}$. Accordingly, by calculating the position in which the maximum flow rate of the straight flow A is lowered to $\frac{1}{10}$, the position of a second nozzle 98 can be determined so that the crossing flow B can be sprouted to the front of the point. Then, it is not necessary to calculate the point P.

In addition, in order to form the maximum eddy viscosity C in a mixing chamber 82, the length L (see FIG. 7) of the mixing chamber 82 is necessary to be secured, but too long length makes a reaction liquid LM easy to stay or reversely flow in the mixing chamber 82 and adversely affects the atomization and the monodispersibility of metal microparticles. Consequently, the length L of the mixing chamber 82 is preferably 2 to 5 times, and further preferably 2 to 3 times of a distance between the first nozzle 96 and the point P which is the position of allowing the eddy viscosity C maximized.

Furthermore, when a liquid is sprouted from the first and second nozzles 96 and 98 having small diameters to a mixing chamber 82 having a larger diameter than the nozzles at a high flow rate, cavitation tends to occur, and by the cavitation, a gas-liquid interface is formed in the mixing chamber 82 to decrease a mixing efficiency. Accordingly, in order to increase the mixing efficiency with the utilization of eddy viscosity C, it is necessary not to form a gas-liquid interface in the mixing chamber 82. Consequently, as shown in FIG. 7, it is necessary to make the bore diameter D4 of an exhaust pipe 88 smaller than the cylinder diameter D1 of the mixing chamber 82 by reducing a bore diameter D4 by a third orifice 104, and to mix two solutions in a state of raising the pressure of the mixing chamber 82. Because cavitation can be canceled thereby, a mixing efficiency is further improved. In addition, in order to shorten a residence time as much as possible in the part which does not contributes to mixing as in an exhaust pipe 88, it is recommended to reduce the cross-sectional area of an outlet in the mixing chamber 82, to make the exhaust pipe 88 having a smaller minor diameter than at least the cylinder diameter D1 of the mixing chamber 82 shortened as much as possible, and to connect it to a pipe 14.

In addition, the shape of a spouted flow from a first nozzle 96 to a mixing chamber 82 is controlled by a first orifice 92 installed in the first nozzle 96, and affects a mixing performance. Thus, according t6 the purpose of a mixture reaction, the shape of a spouted flow is preferably selected among a filar shape, a cone shape, a slit shape and a deltaic shape, through appropriately selecting the first orifice 92 which forms the above shapes. In the case of a reaction, for instance, having an extremely high reaction rate of a millisecond order, a straight flow A and a crossing flow B are necessary to be sprouted so as to make eddy viscosity C instantly maximized in as narrow an area as possible, and then such a first orifice 92 as to form a filar shape of a sprouting flow is preferable. In the case of a reaction having a comparatively low reaction rate, the straight flow A and the crossing flow B are preferably sprouted so as to make the eddy viscosity C maximized in as wide an area as possible, to increase an accompanied interfacial area produced by the straight flow A, and thus in this case, the first orifice 92 which forms a thin-film shape of a sprouting flow is preferably employed. Furthermore, in the case of an intermediate reaction rate between an extremely low reaction rate of a millisecond order and a comparably low reaction rate, the first orifice 92 which forms a cone shape of a sprouting flow is preferable.

FIGS. 9A to 12C show the first orifice 92 for forming each sprouting flow with a filar shape, a cone shape, a slit shape and a deltaic shape. In each figure, Fig. A show a figure of viewing an orifice from a top side, Fig. B shows a longitudinal section of an orifice, and Fig. C shows a cross section of an orifice.

Figure 9A:
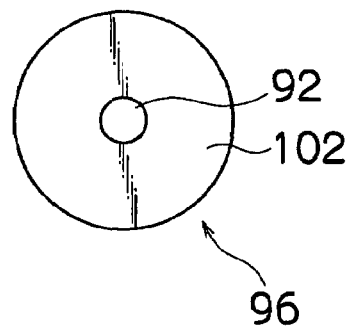
FIGS. 9A to 9C are explanatory drawings for explaining a shape of a first nozzle in a mixing unit by a high-pressure mixing method of a one-jet type.
Figure 9B:
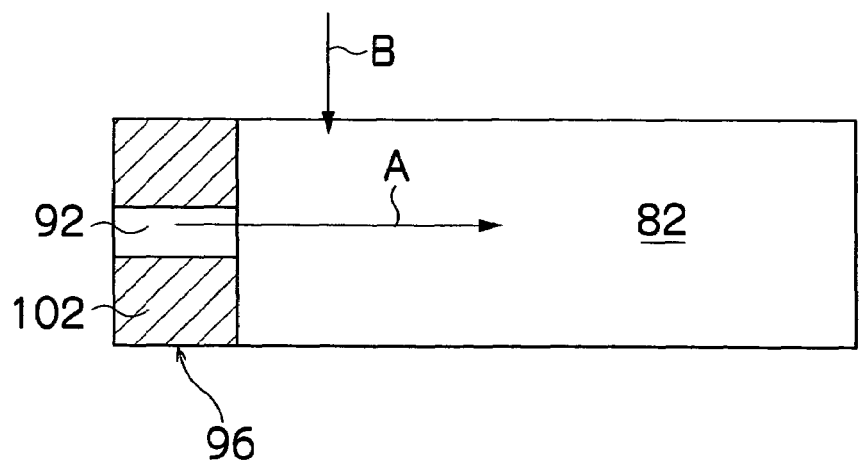
Figure 9C:
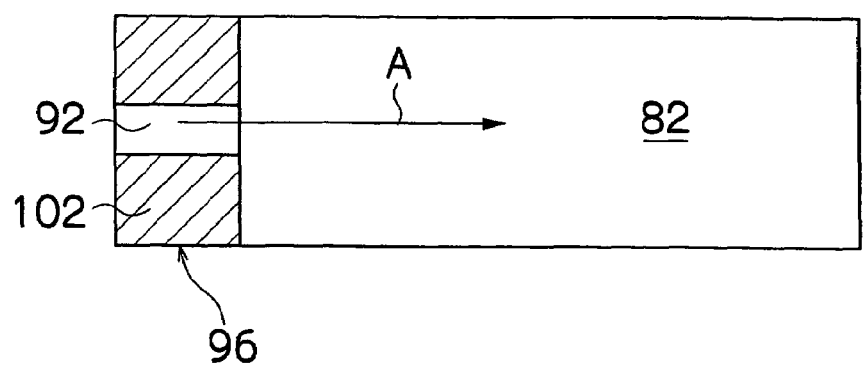
Figure 10A:
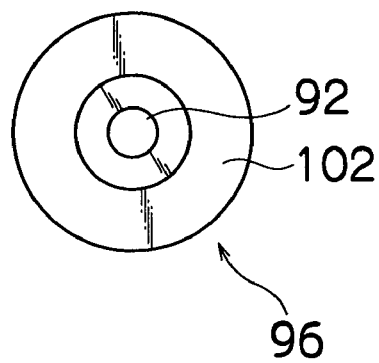
FIGS. 10A to 10C are explanatory drawings for explaining another shape of a first nozzle.
Figure 10B:
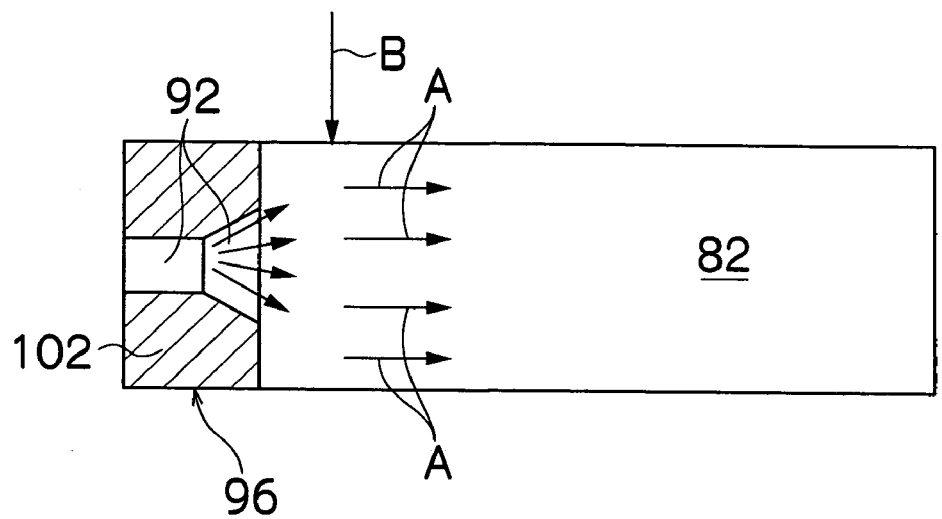
Figure 10C:
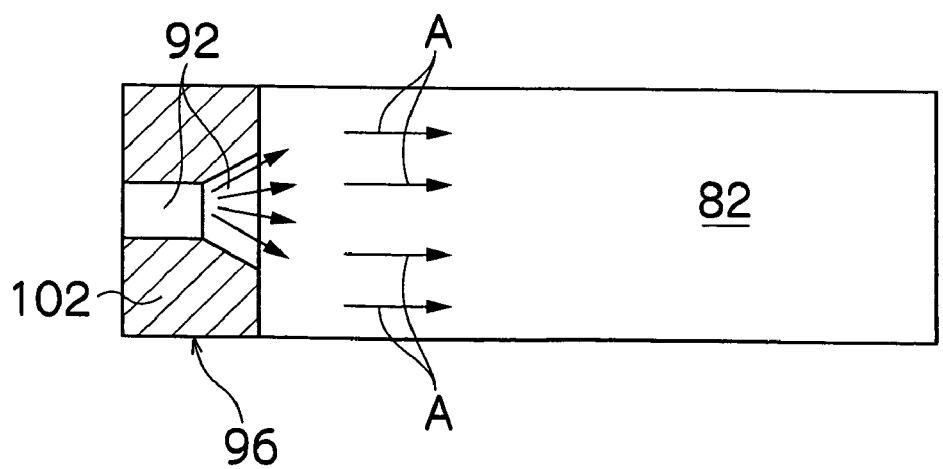
Figure 11A:
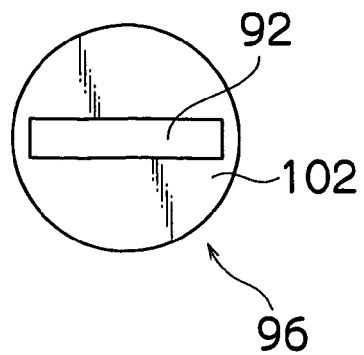
FIGS. 11A to 11C are explanatory drawings for explaining further another shape of a first nozzle.
Figure 11B:
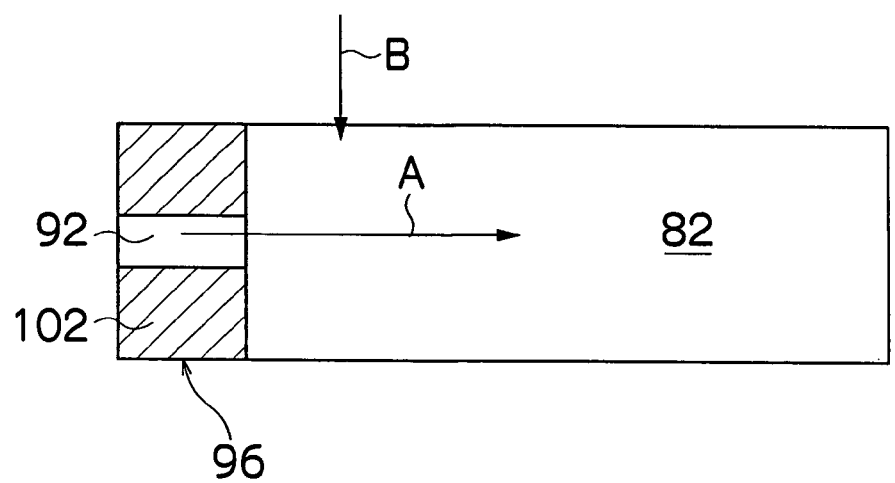
Figure 11C:
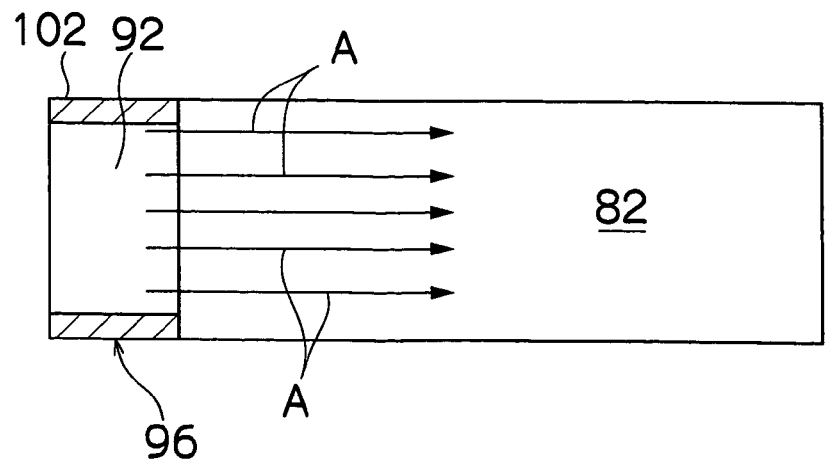
Figure 12A:
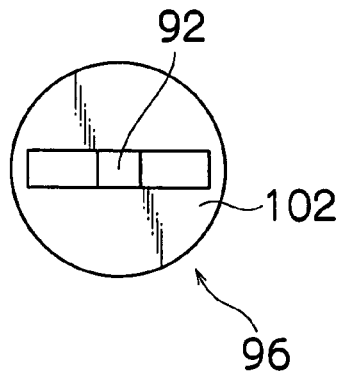
FIGS. 12A to 12C are explanatory drawings for explaining the other shape of a first nozzle.
Figure 12B:
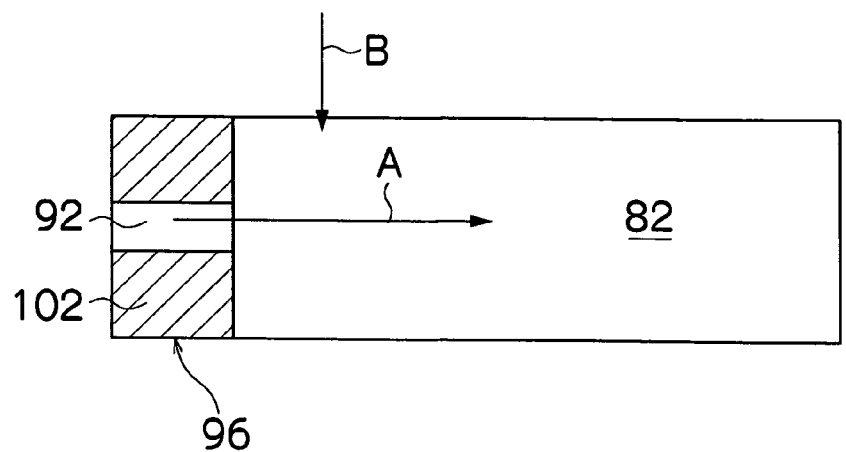
Figure 12C:
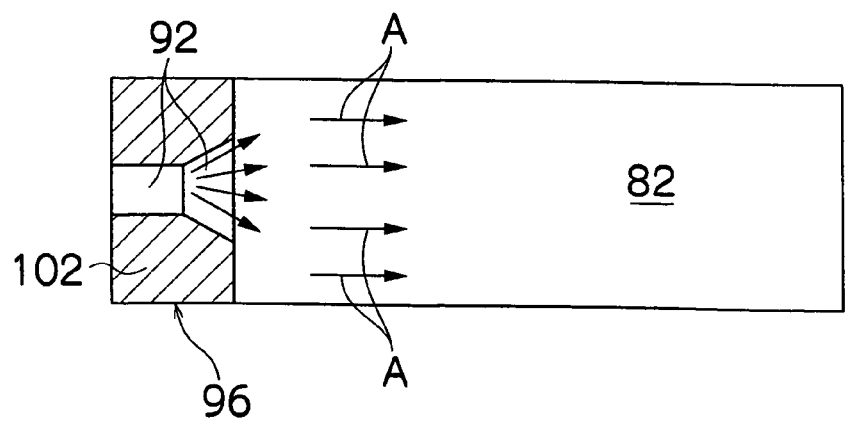

FIGS. 9A to 9C show the shape of a first orifice 92 for sprouting a filar straight flow A to a mixing chamber 82, which is formed into a filar shape. FIGS. 10A to 10C show a shape of the first orifice 92 for sprouting the cone-shape of the straight flow A to the mixing chamber 82, and the straight flow A is formed into the wrapper-tube shape of which the front end is opened. FIGS. 11A to 11C show the first orifice 92 for sprouting a thin straight flow A to the mixing chamber 82, which is formed into the shape of a rectangular slit. FIGS. 12A to 12C show the first orifice 92 for sprouting a deltaic thin straight flow A to the mixing chamber 82, which is formed into a deltaic shape having the diameter of the front end expanded.

In addition, the mixing unit 12 of a one-jet mixing type is not limited to FIG. 7 described above, but any type can be used so far as it employs the static mixing unit which sprouts out first and second solutions L1 and L2 from each nozzle to a mixing field having a larger diameter than the diameter of the nozzle to mix and react the solutions, and discharges the mixed reaction liquid from an exhaust port having a smaller diameter than that of the above described mixing field, sprouts out at least one of the solutions L1 and L2 into a mixing field in the form of a jet flow at a high pressure of 1 MPa or higher and a turbulent flow with the Reynolds number of 10,000 or more when flowing into the mixing field, and can add the rest solution to the front of the position at which the eddy viscosity formed by the high-pressure jet flow in a flow direction, is maximized, with a lower pressure than that of the above described high-pressure jet flow.

b) T-Shape and Y-Shape

Figure 13:
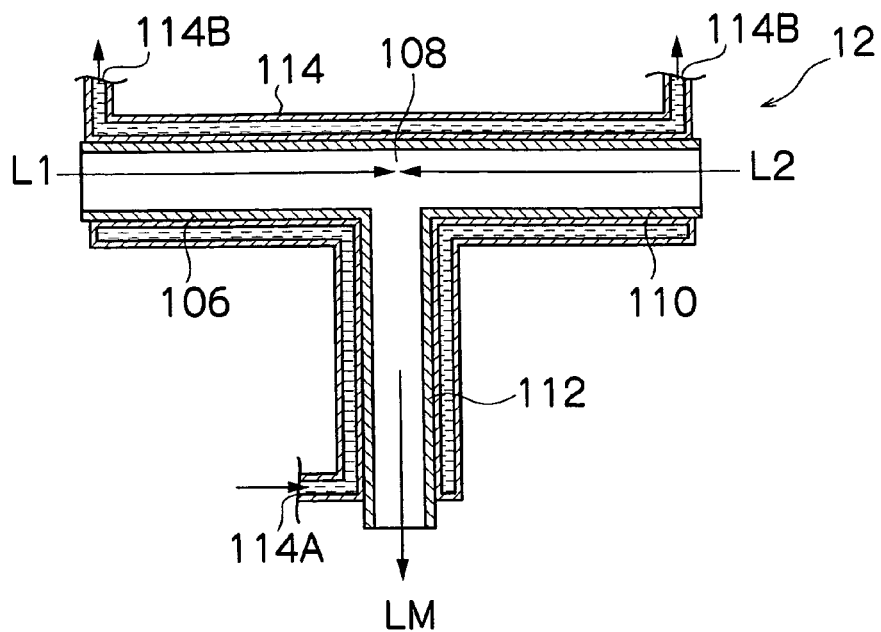
FIG. 13 is a sectional view showing a mixing unit by a high-pressure mixing method of a T-shape type.
Figure 14:
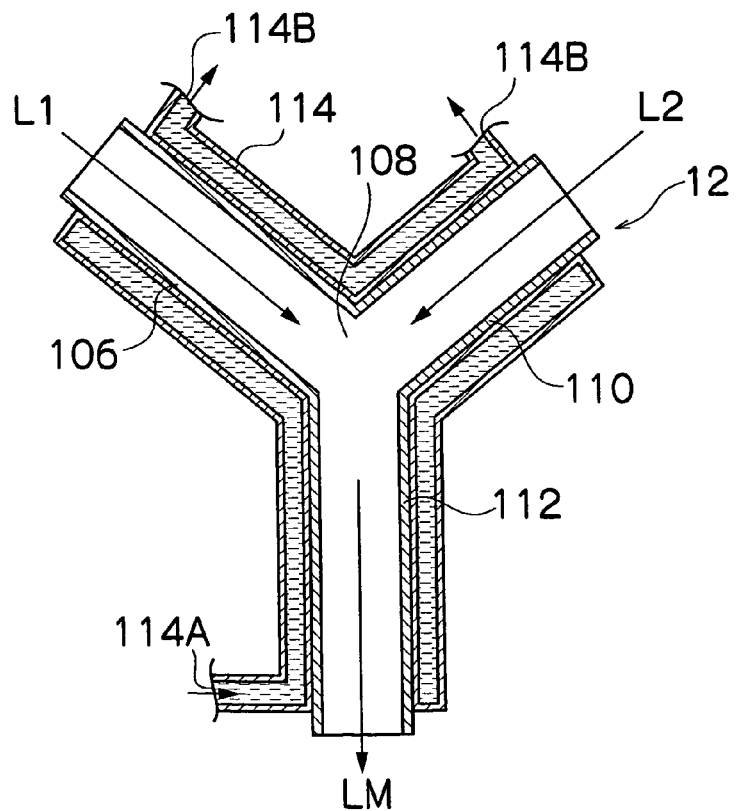
FIG. 14 is a sectional view showing a mixing unit by a high-pressure mixing method of a Y-shape type.

FIGS. 13 and 14 are sectional views of T-shaped and Y-shaped mixing units 12, and FIG. 13 shows a T-shaped pipe and FIG. 14 shows a Y-shaped pipe.

As shown in FIGS. 13 and 14, a T-shaped pipe and a Y-shaped pipe instantly mix first and second solutions L1 and L2 at the intersection (a mixing field) of extremely thin pipes of themselves by colliding both solutions in the form of a jet flow with a high pressure of 1 MPa or higher, and discharge the reacted reaction solution from an exhaust pipe in a short time. More specifically, the T-shaped type and the Y-shaped type sprout a first solution L1 from a first adding pipe 106 to the mixing field 108 in the jet flow with a high pressure of 1 MPa or higher, and the second solution L2 from a second adding pipe 110 to the mixing field 108 in the jet flow with a high pressure of 1 MPa or higher, to collide both solutions; and then the reaction liquid LM which has been mixed by the energy of collision and reacts by mixing, is discharged from an exhaust pipe 112 in a short time. In addition, the pressures of the first and second solutions L1 and L2 may be equal or different from each other, so far as they are 1 MPa or higher. In addition, around the peripheries of the first adding pipe 106, the second adding pipe 110 and the exhaust pipe 112, a jacket 114 is wound to control a mixture reaction temperature of the first and second solutions L1 and L2 in the mixing field 108. Here, a numeral 114A in FIGS. 13 and 14 denotes an inlet for a heating medium of the jacket 114, and a numeral 114B denotes an outlet for the heating medium.

Thereby, first and second solutions L1 and L2 are so instantly and effectively mixed and react under an appropriate mixture reaction temperature condition, and the reacted liquid is so immediately discharged from an exhaust pipe 112 that metal microparticles having fine sizes and adequate monodispersibility can be formed.

c) Two Counter-Jets Type

Figure 15:
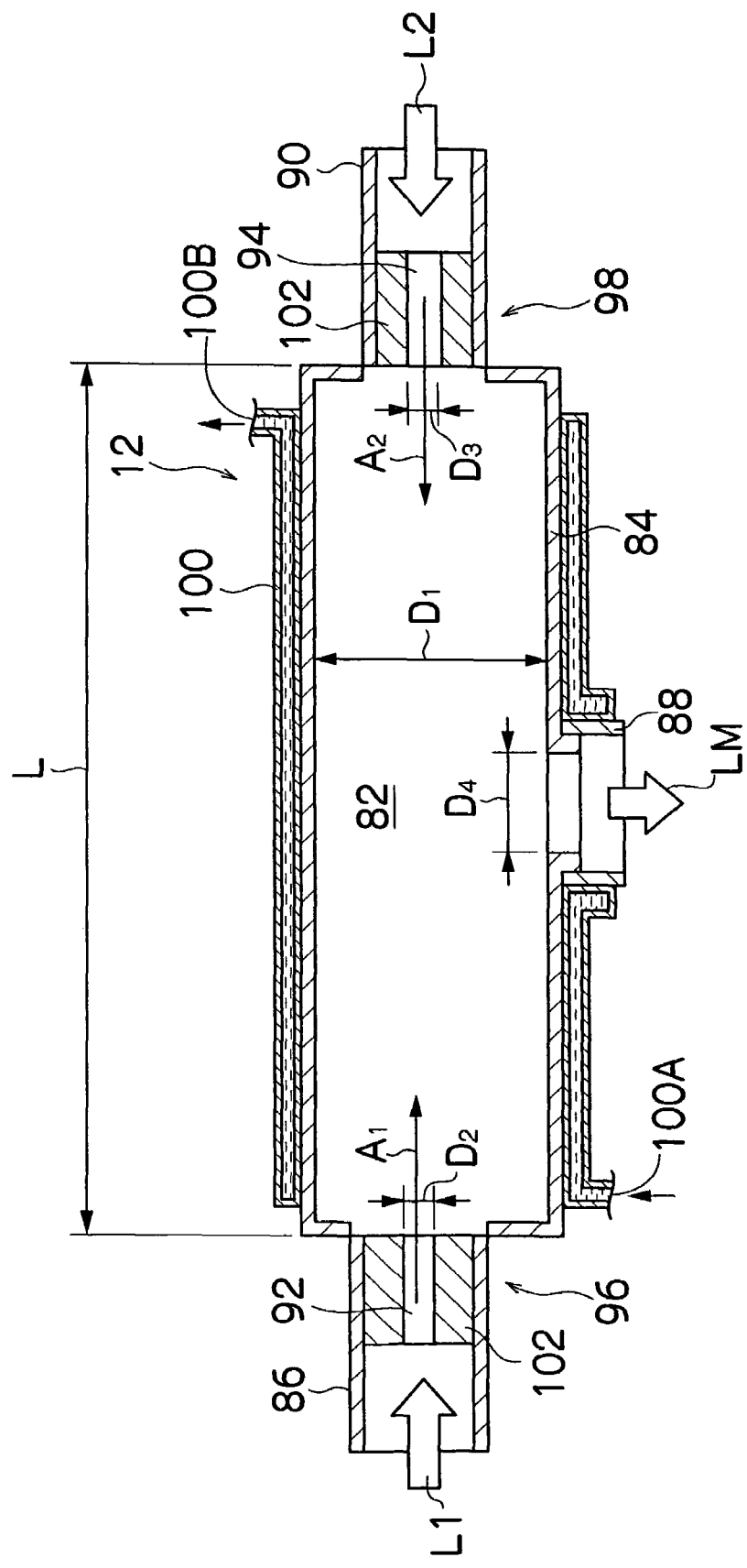
FIG. 15 is a sectional view showing a mixing unit by a high-pressure mixing method of a two counter-jets type.

FIG. 15 shows a mixing method adding a concept of eddy viscosity to a T-shaped type, where the same member with the member in FIG. 7 is marked with the same numeral for convenience of explanation. The mixing method comprises sprouting first and second solutions L1 and L2 from a counter direction in the form of a jet flow with a high pressure of 1 MPa or higher, to a mixing chamber 82 (a mixing field) having a diameter larger than that of a nozzle for sprouting the solutions L1 and L2, to collide them, mixing them by taking the advantage of eddy viscosity produced in both solutions, and discharging the reacted liquid LM from an exhaust pipe 88 having a smaller diameter than the mixing chamber 82 has.

A mixing unit 12 in FIG. 15, has a first conduit 86 for introducing a first solution L1 into a mixing chamber 82 connected to the one-end opening of a mixing vessel 84 having a cylindrical mixing chamber 82 for mixing and reacting the first solution L1 and a second solutions L2, formed therein; the second conduit 90 for introducing the second solution L2 into the mixing chamber 82 connected to the other-end opening; and an exhaust pipe 88 for discharging the reacted liquid LM which has been mixed and reacted in the mixing chamber 82, from the mixing chamber 82, connected to the central opening of the mixing vessel 84.

Inside the tips of first and second conduits 86 and 90, first and second orifices 92 and 94 are respectively installed, and thereby first and second nozzles 96 and 98 for jetting turbulent straight flows A1 and A2 are formed in the first and second conduits 86 and 90. Here, in the present embodiment, an example is described for the configuration in which a first solution L1 is sprouted from the first nozzle 96 and a second solution L2 is sprouted from the second nozzle 98, but the example may have the reversed configuration.

In addition, a jacket 100 is wound around the periphery of a mixing vessel 84 to control a mixture reaction temperature of first and second solutions L1 and L2 in a mixing vessel 84, as having been described in FIG. 7.

Furthermore, the two counter-jets type has the similar cylindrical diameter D1 of a mixing chamber 82, the similar orifice diameter D2 of a first nozzle 96, the similar orifice diameter D3 of a second nozzle 98, and the similar dimension relations thereof to the one-jet type; and has a similar method for forming first and second orifices 92 and 94, and material of an orifice material 102 and a compressing device to those described in the one-jet type. The shapes of the straight flows A1 and A2, as have been described in the one-jet type, can be formed into each shape of a sprouting flow of a filar shape, a cone shape, a slit shape and a deltaic shape.

Figure 16:
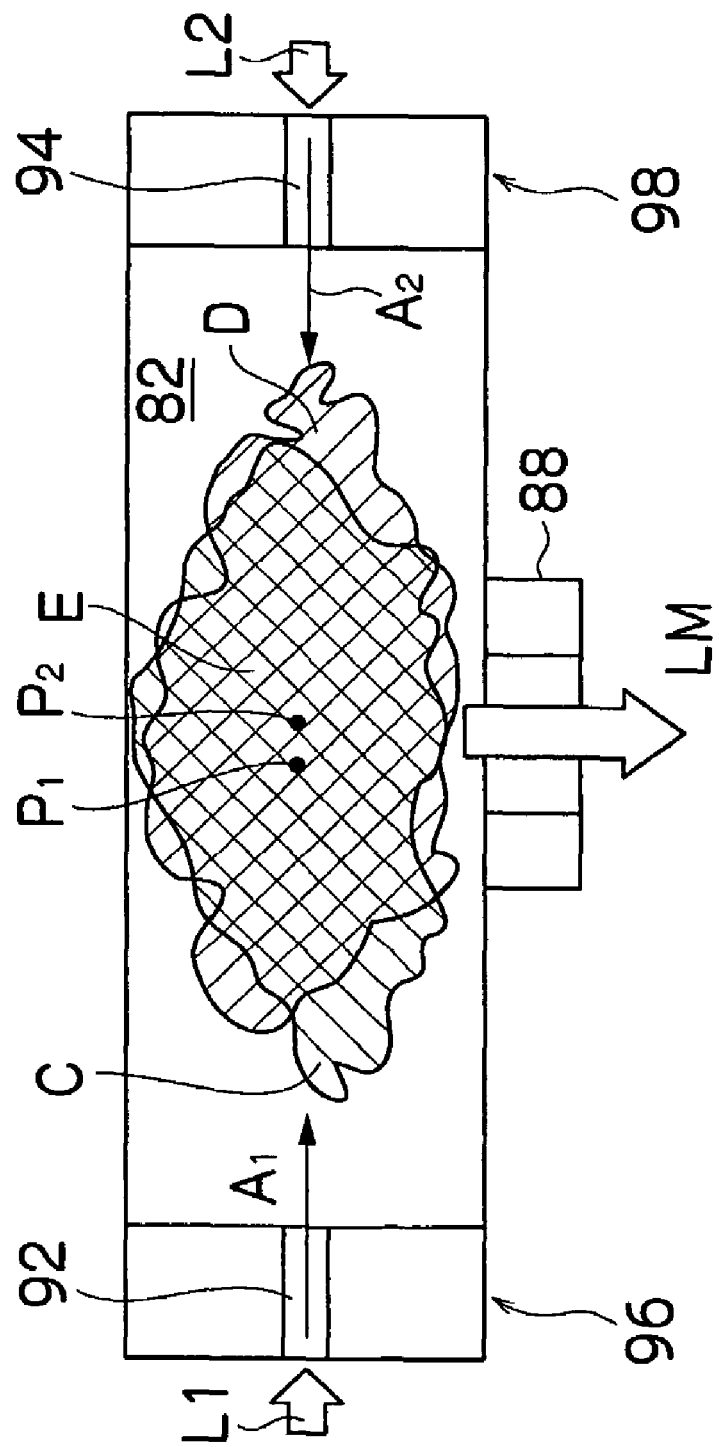
FIG. 16 is an explanatory drawing for explaining a mixture theory in a high-pressure mixing method of a two counter-jets type.

Then, as shown in FIG. 16, first and second solutions L1 and L2 are sprouted in the form of a jet flow with a high pressure of 1 MPa or higher from both one end and the other end of a mixing chamber 82, through first and second nozzles 96 and 98, and are collided as counter turbulent straight flows A1 and A2 in the mixing chamber 82. By overlapping two eddy viscosities C and D formed by two straight flows A1 and A2, the solutions L1 and L2 are instantly mixed under an appropriate mixture reaction temperature condition, and the reaction liquid LM that reacts by mixing is immediately discharged from an exhaust pipe 88 to a pipe 14. Thereby, metal microparticles having fine sizes and adequate monodispersibility can be formed.

A mixture reaction acquires a high mixing efficiency, when the positions to obtain maximum eddy viscosities C and D formed in a mixing chamber 82 by respective two high-speed turbulent straight counter-flows A1 and A2, are overlapped so as to make the eddy viscosity at an area E as large as possible. In other words, it is preferable that the straight flows A1 and A2 do not collide with each other right after being sprouted into the mixing chamber 82, but collide at the position where the two eddy viscosities C and D formed in the mixing chamber 82 by the straight flows A1 and A2 make the eddy viscosity at the overlapped area E as large as possible. For this purpose, it is preferable to adequately set a separation distance L (see FIG. 15) between the facing first and second nozzles 96 and 98, or in other words, a length of a mixing field. Thus, adequate setting for the separation distance L between the first and second nozzles 96 and 98, can make the area E reliably large where the maximized eddy viscosities C and D are mutually overlapped, and besides the two eddy viscosities C and D can be almost completely overlapped with each other. For this purpose, it is necessary to know the position at which the eddy viscosities C and D are maximized, and the position at which the eddy viscosities C and D are maximized in the mixing chamber 82 can be previously simulated with the use of a numerical analysis software RFLOW made by Rflow Co., Ltd., which has been already on the market as the flow analysis software in Japan. Then, a distance between the first nozzle 96 and the eddy viscosity C, and a distance between the second nozzle 98 and the eddy viscosity D can be grasped. As for the above position, as can be seen from FIG. 16, the positions for obtaining maxim eddy viscosities C and D are not pinpoints but have areas. Accordingly, the separation distance L between the first nozzle 96 and the second nozzle 98 is desirably determined as a total value of a distance between the first nozzle 96 and a point P1 and a distance between the second nozzle 98 and a point P2 when the point P1 is matched with the point P2, where the points P1 and P2 are defined as the positions of the approximately central parts in the obtained maximum eddy viscosities C and D. In addition, as for another method for grasping the points P1 and P2, there is an analysis method with the use of the above described numerical analysis software. According to the analysis, the points P1 and P2 for allowing the eddy viscosities C and D maximized by straight flows A1 and A2 have a relation with the flow rates of the straight slows A1 and A2, and approximately match the positions for allowing the flow rates of the straight flows A1 and A2 lowered to 1/10 of the maximum flow rates (normally flow rates of the first or second nozzle positions). Accordingly, by calculating such positions as to allow the flow rates of the straight flows A1 and A2 lowered to 1/10 of the maximum flow rates, the points P1 and P2 may be grasped. Thus, overlapping of the eddy viscosities C and D at the positions of allowing the eddy viscosities C and D maximized, has an effect of improving a mixture reaction performance through increasing a contacting efficiency on a liquid-liquid interface of the straight flows A1 and A2, and besides, exerts the effect of controlling the heat generation caused by liquid-liquid friction due to the collision of the straight flows A1 with the straight flow A2.

Subsequently, a structure of a gas-liquid separation unit 16 which is preferably used in a unit for producing metal microparticles according to the present invention will be described.

A gas-liquid separation unit 16 used in the present invention needs to have a structure capable of stabilizing the flow of a reaction liquid by continuously and efficiently removing a byproduct gas continuously generated with the proceeding of the reaction, on the way of the pipe before a reaction liquid of reacting by mixing in the first mixing unit 12 flows through the pipe 14 and reaches the second mixing unit 18. The preferably usable separation unit includes a tubular channel type, a cyclone type and an open channel type. The structures of these types will be described below.

(4) Tubular Channel Type

Figure 17:
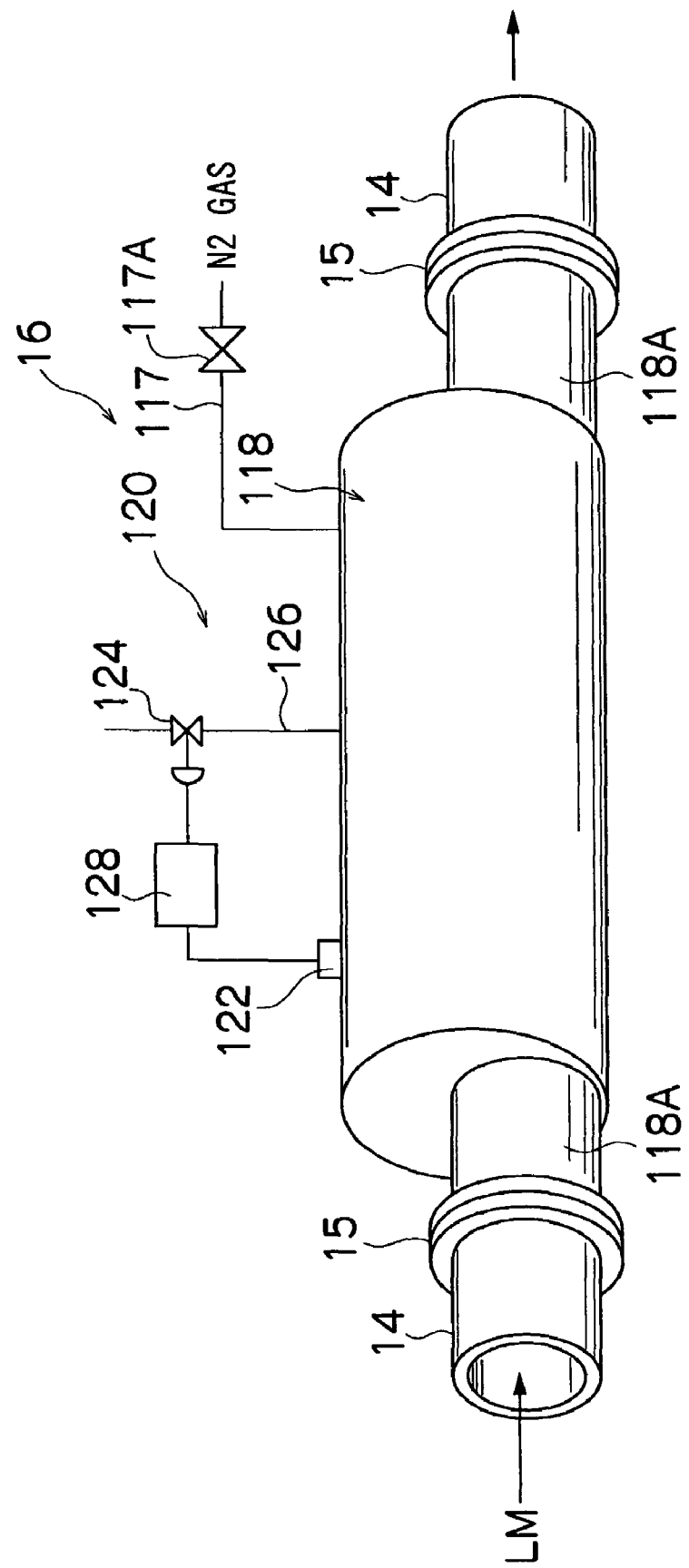
FIG. 17 is a perspective view showing a gas-liquid separation unit of a tubular channel type.
Figure 18:
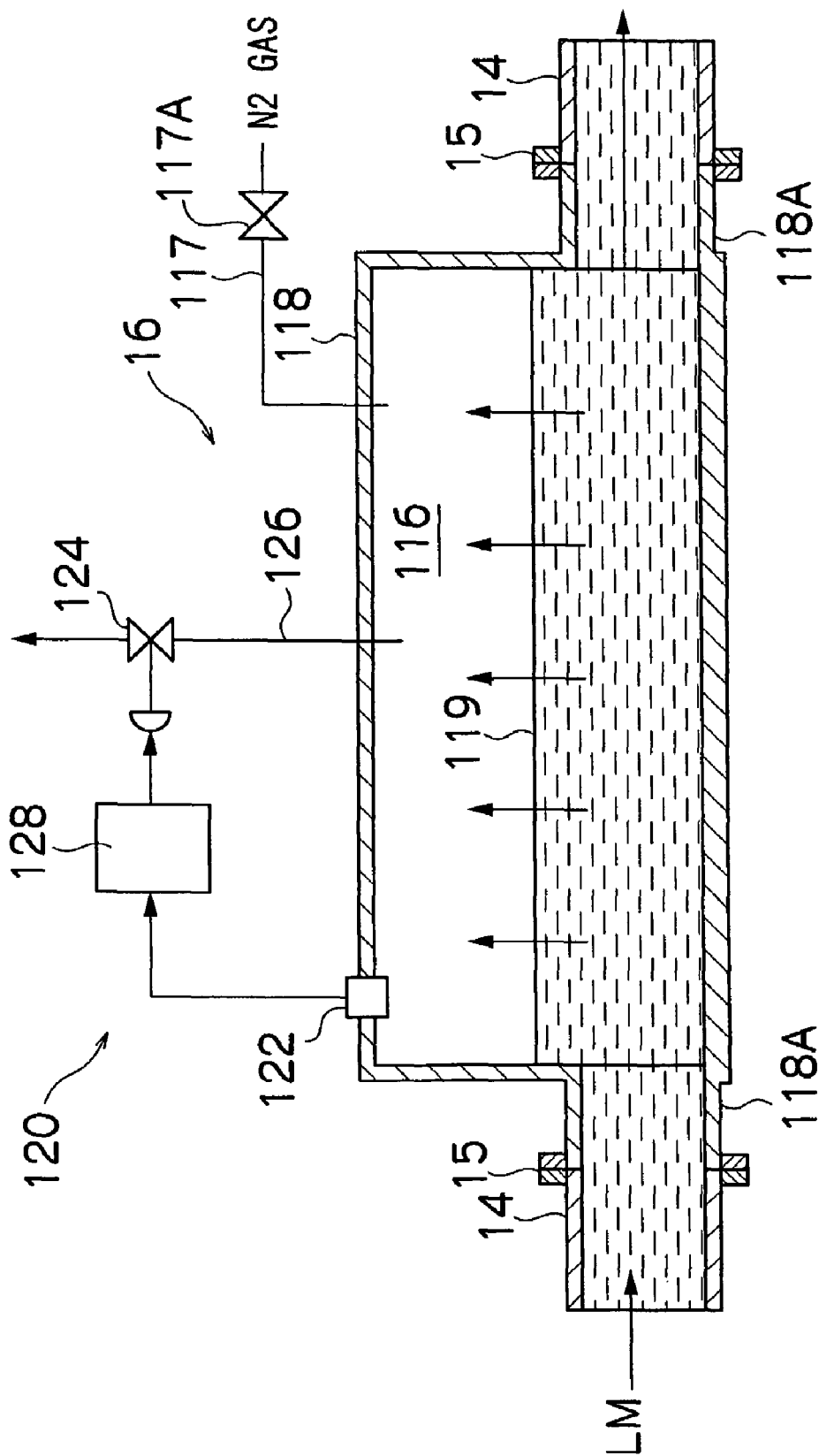
FIG. 18 is a sectional view of a gas-liquid separation unit of a tubular channel type.

FIG. 17 is a perspective view of the gas-liquid separation unit 16 of a tubular channel type. FIG. 18 is a sectional view along the flowing direction of a reaction liquid. As shown in the figures, the gas-liquid separation unit 16 mainly comprises a gas-liquid separation pipe 118 of a gas-liquid separation structure, which is connected to a midway of a pipe 14, has a space of a larger volume per unit than the pipe 14 has, and forms a gas-liquid interface 119 when a reaction liquid LM flows through the space; and a pressure adjustment device 120 for adjusting the pressure of the headspace part 116 of a gas phase part above the gas-liquid interface 119. In a lower part of both sides of the gas-liquid separation pipe 118, there project connecting pipes 118A and 118A having diameters both equal to that of the pipe 14, and the connecting pipes 118A and 118A are connected with the pipes 14 through flanges 15.

A pressure adjustment device 120 mainly comprises a pressure sensor 122 for measuring the pressure of a headspace part 116, a vent pipe 126 with a valve 124 for exhausting a byproduct gas accumulated in the headspace part 116, and a control part 128 for opening and closing the valve 124 on the basis of the measured value by the pressure sensor 122.

Figure 19:
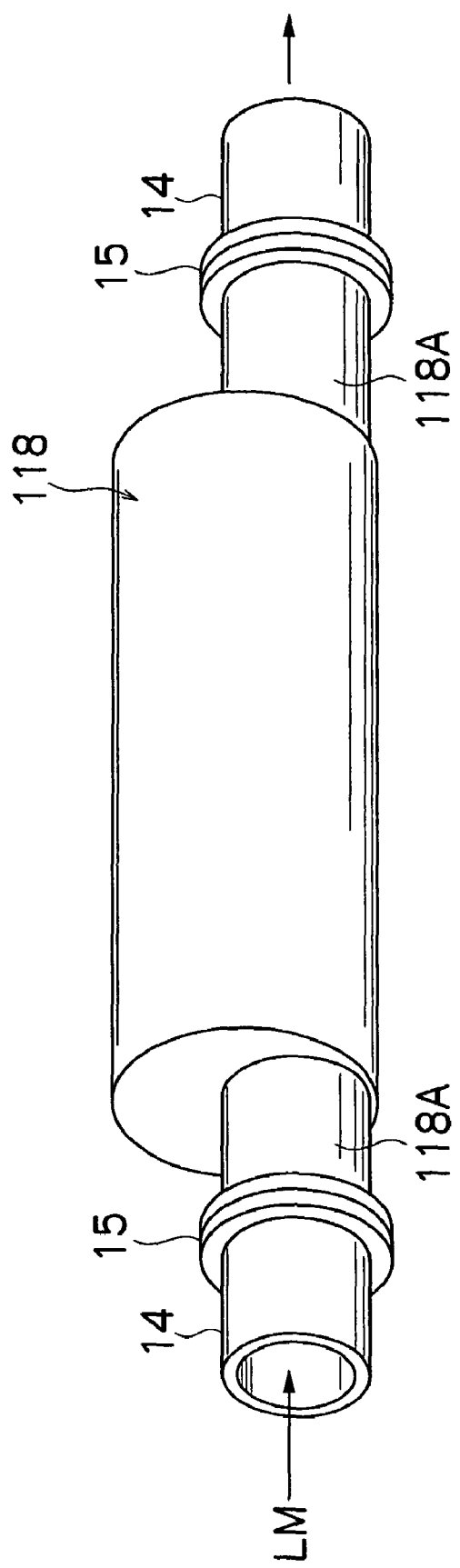
FIG. 19 is a perspective view of a gas-liquid separation pipe of an elliptical shape.
Figure 20:
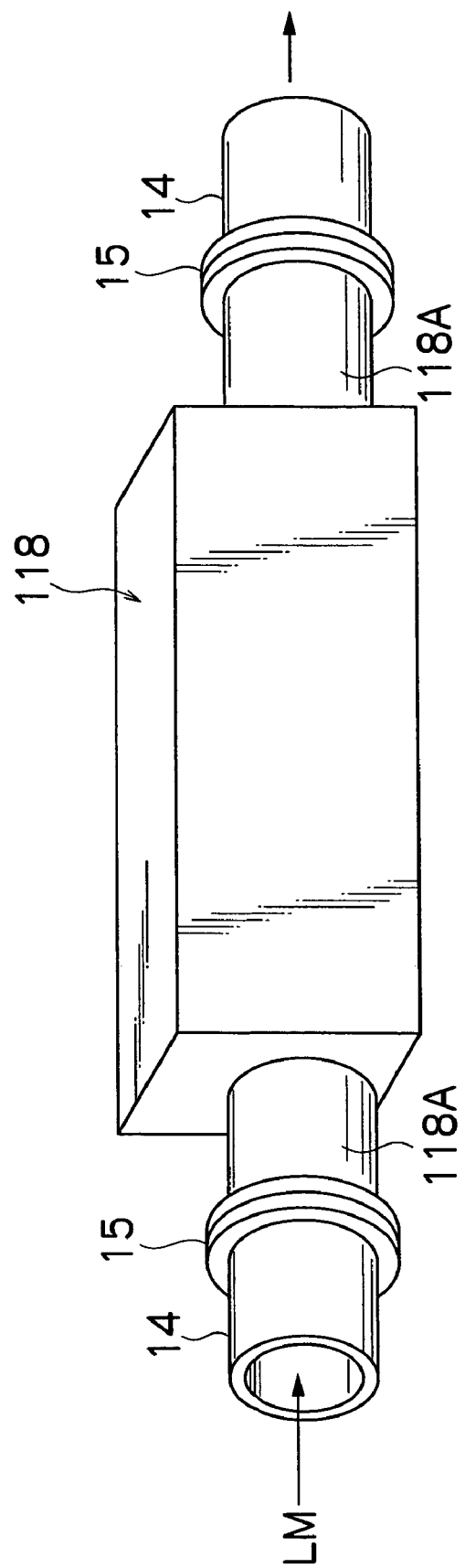
FIG. 20 is a perspective view of a gas-liquid separation pipe of a quadrilateral shape.

In addition, in FIG. 17, a gas-liquid separation pipe 118 has a cylindrical shape for a gas-liquid separation structure, but is not limited to the shape. The usable shape includes such various shapes, so far as a headspace part 116 is formed above a gas-liquid interface 119 when a reaction liquid LM flows through the gas-liquid separation pipe 118, as an ellipsoid shape as shown in FIG. 19 and a square shape in FIG. 20, and may further include a box form. However, such a shape as to make the reaction liquid LM hardly flow through the gas-liquid separation pipe 118 smoothly, or a shape as to easily form a dead space of the flow is unfavorable, because a part of a reaction liquid LM stays in such a gas-liquid separation pipe 118, which hinders the uniformization of the reaction. In this respect, the most preferable shape for the gas-liquid separation pipe 118 is an ellipsoidal shape, particularly having the same shape in the lower circular part of the gas-liquid separation pipe 118 as the shape in the lower semicircular part of a pipe 14, the secondly preferable shape of the gas-liquid separation pipe 118 is a cylindrical shape, and the thirdly preferable shape of the gas-liquid separation pipe 118 is a square pipe shape. In addition, when there is a step between the lower ends of the pipe 14 and the gas-liquid separation pipe 118, the flowing liquid easily stay at the step, so that the lower end of the pipe 14 is preferably flush with the gas-liquid separation pipe 118, as shown in FIG. 18. By the way, in FIGS. 19 and 20, a pressure adjustment device 120 and a pipe 117 for purging air with an inert gas are abbreviated.

In order to form an appropriate headspace part 116 in a gas-liquid separation pipe 118, the gas-liquid separation pipe 118 has preferably a larger diameter than a pipe 14 has, so as to have 1.5 times as large as or larger volume per unit length (in the longitudinal direction of a reaction liquid) than the volume per unit length of the pipe 14. Thus, when the reaction liquid passes through the gas-liquid separation pipe 118 having a larger volumetric space than the pipe 14 has, a gas-liquid interface 119 is formed in the gas-liquid separation pipe 118 and between a liquid phase part in which a reaction liquid LM flows, and a gas phase part of a headspace part 116 in which a byproduct gas released from the reaction liquid LM is accumulated. Then, the byproduct gas generated with the proceeding of the reaction in the pipe 14 changes into bubbles in a reaction liquid, and moves up to the surface, so that when the reaction liquid LM passes through the gas-liquid separation pipe 118, the byproduct gas is released into the headspace part 116 through the gas-liquid interface 119. In this case, it is very important for stabilization and uniformization of a reaction in the pipes 14 in front and in the rear of the gas-liquid separation unit 16 of a tubular channel type, to continuously and efficiently remove the generated byproduct gas while keeping the pressure of the headspace part 116 accurately constant, or equivalently, while keeping the position of the gas-liquid interface 119 constant, and thereby to stabilize the flow of the reaction liquid LM.

From the above fact, a valve 124 used for a pressure adjustment device 120 preferably opens and closes both at a speed of response of 10 milliseconds or shorter, and further preferably of 5 milliseconds or shorter. As for the valve opening and closing both in the speed of response of 5 milliseconds or shorter, a servo valve is available. Thereby, when the measured value of a pressure sensor 122 deviates from a predetermined pressure set value, the valve opens or closes at a very high opening or closing speed, which can eliminate fluctuations in the pressure of a headspace part 116. In addition, when the valve 124 has a speed of response of 10 milliseconds or longer, a resistor (not shown) for decreasing a discharge rate of a byproduct gas may be installed at some point of a vent pipe 126 including the valve 124, to make a pressure control easy. As the resistor, an orifice or a filter can be preferably used.

The above described gas-liquid separation unit 16 of a tubular channel type can continuously and efficiently remove a byproduct gas only by passing a reaction liquid LM in a gas-liquid separation pipe 118 having the pressure of a headspace part 116 kept constant. Thereby, a unit 10 for continuously producing metal microparticles can be easily constructed only by installing a gas-liquid separation unit 16 of the tubular channel type in a midway of the pipe 14 which connects the first mixing unit 12 with the second mixing unit 18. In addition, because the flow of a reaction liquid LM in the gas-liquid separation pipe 118 can be stabilized by keeping the pressure of a headspace part 116 constant, the flow of the reaction liquid LM flowing through the pipe 14 can be stabilized in the pipes 14 in front and in the rear of the gas-liquid separation unit 16 of the tubular channel type.

(5) Cyclone Type

Figure 21A:
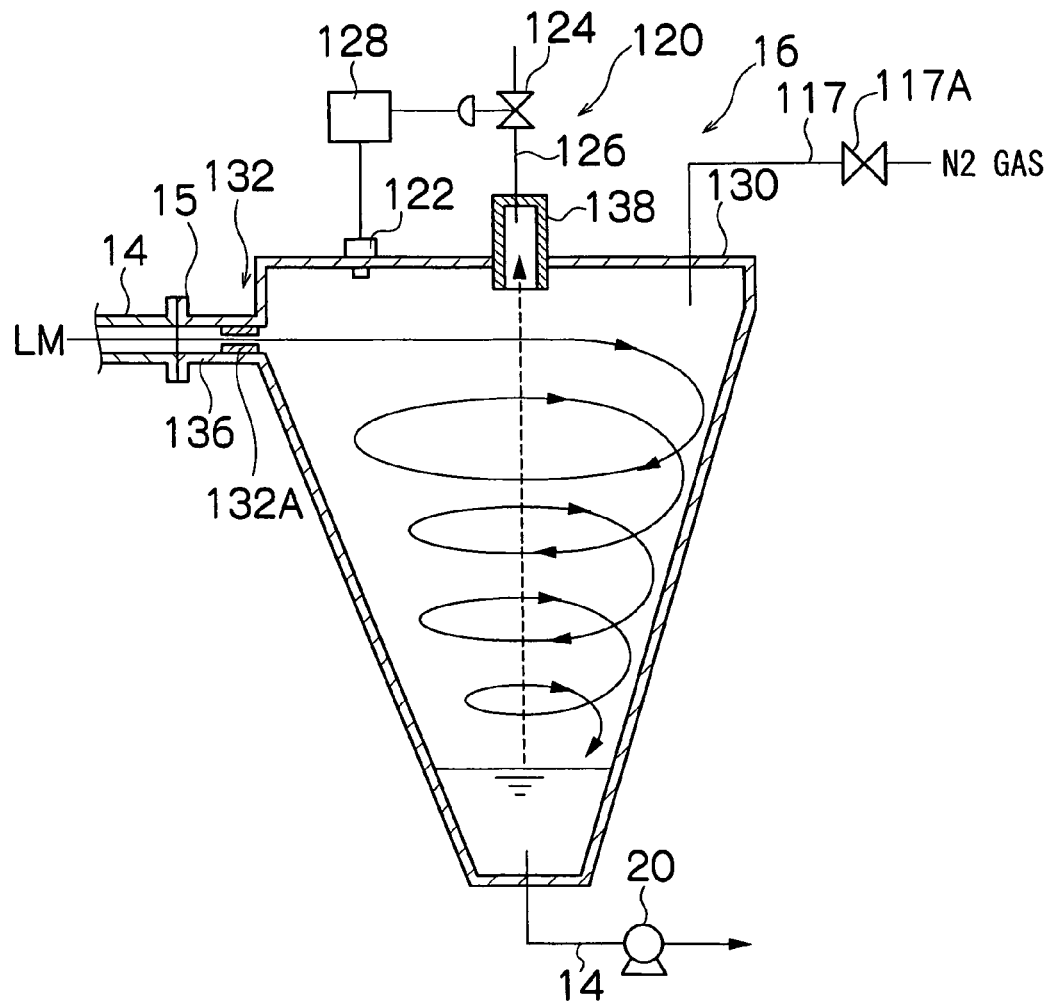
FIGS. 21A and 21B are sectional views of a gas-liquid separation unit of a cyclone type.
Figure 21B:
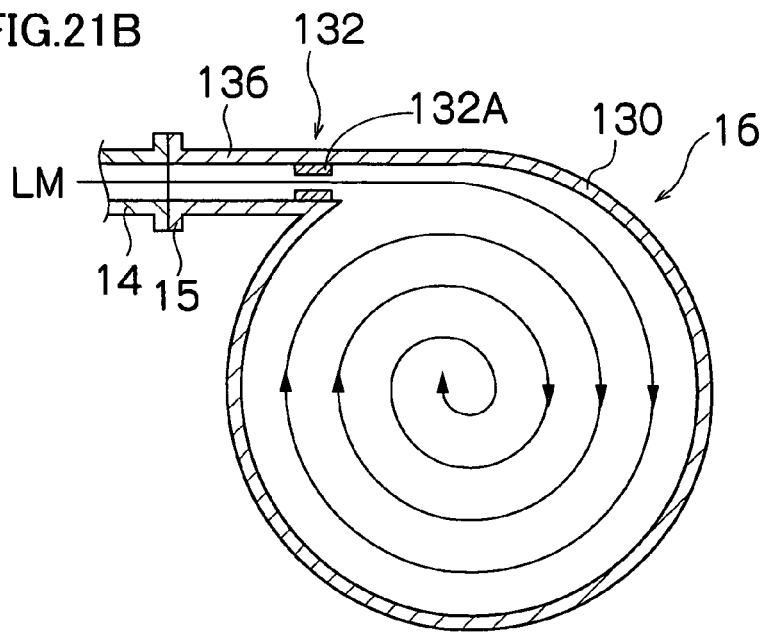

FIG. 21A is a longitudinal sectional view and FIG. 21B is a transversal sectional view both of a gas-liquid separation unit 16 of a cyclone type. As shown in FIGS. 21A and 21B, a gas-liquid separation unit 16 mainly comprises a convolute flow-producing tank 130 which is connected to a midway of the pipe 14, and produces a convolute flow in the reaction liquid LM, a convolute flow-speed adjustment device 132 for making the speed of the convolute flow of a reaction liquid flowing in the convolute flow-producing tank 130 more rapid than the flow speed of the reaction liquid LM flowing through the pipe, and a pressure adjustment device 120 for adjusting a pressure in the convolute flow-producing tank 130.

In a convolute flow-producing tank 130, an inflow tube 136 is installed at an upper wall in a tangential direction, which is connected to a pipe 14 through a flange 15, and in the inflow tube 136, a convolute flow-speed adjustment device 132 is installed. For a convolute flow adjustment device 132, a reducing member 132A, such as an orifice, for reducing the minor diameter of the inflow tube 136 below that of the pipe 14. The reducing member 132A makes the convolute flow speed of a reaction liquid LM flowing from the inflow tube 136 into the convolute flow-producing tank 130 to be twice or more of the flow speed of the reaction liquid LM flowing through the pipe 14 connected to the inflow tube 136, and to be 2 m/second or higher in terms of an inflow speed. In addition, the convolute flow-producing tank 130 has a vent tube 138 installed coaxially with the convolute flow-producing tank 130, which penetrates the top plate of the convolute flow-producing tank 130, and exhausts a byproduct gas released from a reaction liquid LM therethrough.

A pressure adjustment device 120 mainly comprises a pressure sensor 122 for measuring the pressure inside a convolute flow-producing tank 130 through the bent tube 138, a vent pipe 126 with a valve 124 for exhausting a byproduct gas accumulated inside the convolute flow-producing tank 130, and a control part 128 for opening and closing the valve 124 on the basis of the measured value by the pressure sensor 122. Thus, the pressure adjustment device 120 controls the pressure in the convolute flow-producing tank 130 so as to be constant; thereby, stabilizes the inflow speed of a reaction liquid LM flowing from an inflow tube 136 into the convolute flow-producing tank 130; and stabilizes the flow of the reaction liquid LM flowing through the pipe 14 connected to the inflow tube 136. In this case as well, in order to control a pressure in the convolute flow-producing tank 130 to be accurately constant, the valve 124 used for the pressure adjustment device 120 preferably opens and closes both at a speed of response of 10 milliseconds or shorter, and further preferably of 5 milliseconds or shorter. As for the valve opening and closing both in the speed of response of 5 milliseconds or shorter, a servo valve is available. In addition, when the valve 124 has the speed of response of 10 milliseconds or longer, a resistor (not shown) for decreasing a discharge rate of a byproduct gas may be installed at some point of the vent pipe 126 including the valve 124, to make a pressure control easy. As the resistor, an orifice or a filter can be preferably used.

In the gas-liquid separation unit 16 of a cyclone type configured as described above, a reaction liquid LM injected into a convolute flow-producing tank 130 through a reducing member 132A of an inflow tube 136 produces a convolute flow moving downward along the inner wall of the convolute flow-producing tank 130 to give a centrifugal force to the reaction liquid LM. Owing to the centrifugal force, a byproduct gas having a lower specific gravity than the reaction liquid LM has, is released and collected in an upper part inside the convolute flow-producing tank 130, and the degassed reaction liquid LM is collected in the bottom part inside the convolute flow-producing tank 130. The reaction liquid LM collected in the bottom part inside the convolute flow-producing tank 130 is continuously discharged based on a balance between a pressure in the convolute flow-producing tank 130 and flow resistance in the pipe 14. In this case, it is advisable to control the pressure in the convolute flow-producing tank 130 so as to constantly balance an inflow charged into the convolute flow-producing tank 130 and the outflow discharged from the inside of the convolute flow-producing tank 130. The above described operation for controlling the pressure in the convolute flow-producing tank 130 constant makes the output stable, the retention time of a reaction liquid LM in the convolute flow-producing tank 130 constant, and fluctuation of the necessary time for the reaction liquid LM to reach the second mixing unit 18 from the first mixing unit 12 reduced. In addition, when a pump 20 is installed in the pipe 14 as shown in FIGS. 21A and 21B, it is further preferable to continuously extract the amount equal to the inflow of the reaction liquid LM flowing into the convolute flow-producing tank 130 with the pump.

Thereby, a unit 10 for continuously producing metal microparticles can be easily constructed only by installing the gas-liquid separation unit 16 of a cyclone type in a midway of the pipe 14 which connects the first mixing unit 12 with the second mixing unit 18. In addition, by making the flow speed of a reaction liquid LM flowing into a convolute flow-producing tank 130 from an inflow tube 136 to be twice as large as or larger than that inside the pipe 14, and increasing the real inflow speed to 2 m/second or higher, gas-liquid separation can be promoted and thereby a byproduct gas can be continuously and efficiently removed from the reaction liquid LM. In addition, the gas-liquid separation unit 16 of the cyclone type has a structure which stabilizes the inflow speed of the reaction liquid LM flowing into the convolute flow-producing tank 130 from the inflow tube 136, by keeping a pressure in the convolute flow-producing tank 130 constant, and at the same time, extracting the equal amount of the degassed reaction liquid LM collected in the bottom part in the convolute flow-producing tank 130 to the amount of the reaction liquid flowing therein, so that the flow of the reaction liquid flowing through the pipe 14 can be stabilized in the pipes 14 in front and in the rear of the gas-liquid separation unit 16 of a cyclone type.

Figure 22:
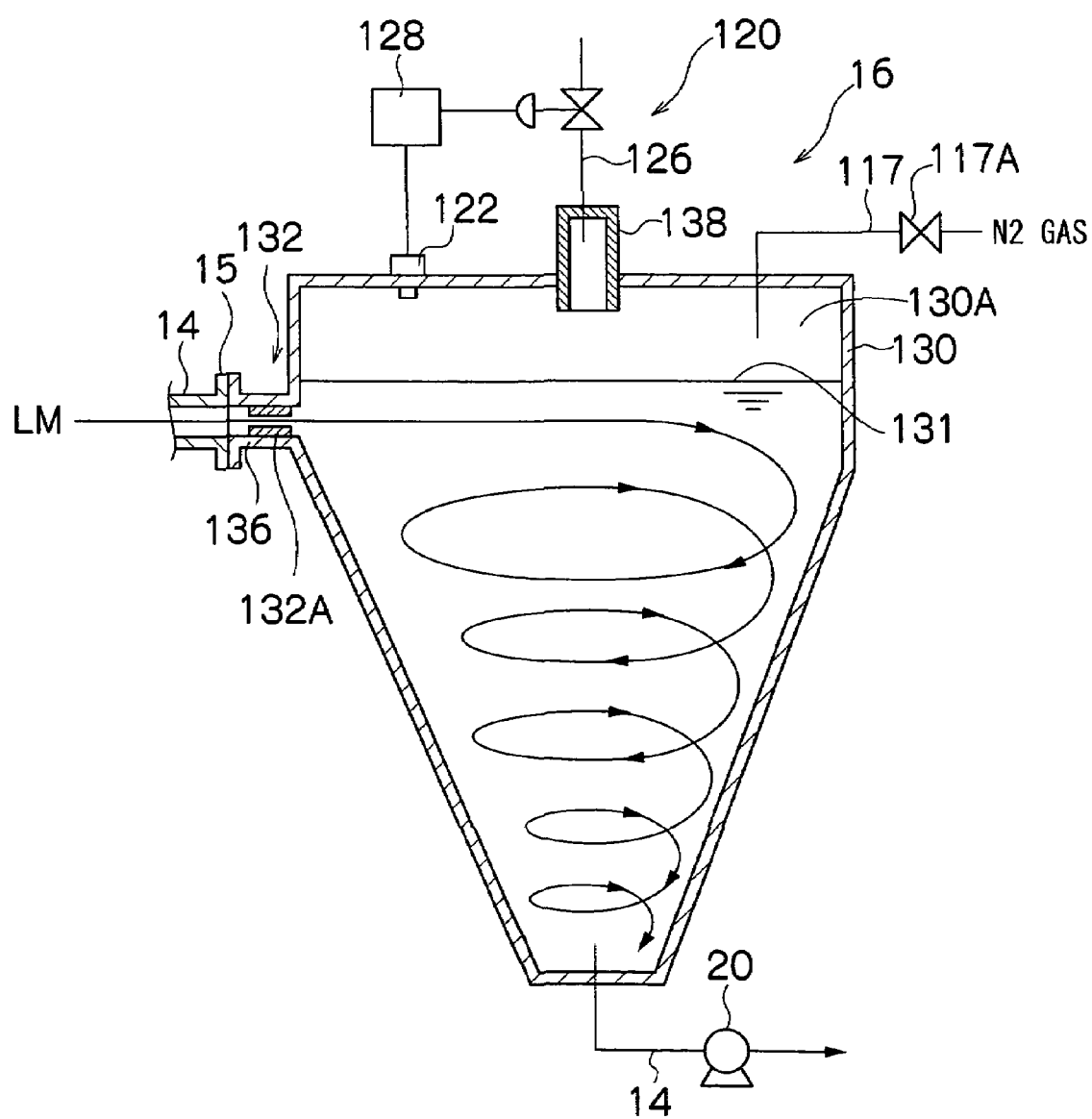
FIG. 22 is a sectional view of a modified example for a gas-liquid separation unit of a cyclone type.

FIG. 22 is a modified example of the gas-liquid separation unit 16 of a cyclone type.

As shown in FIG. 22, a convolute flow-producing tank 130 pools a solvent used in preparing a reaction liquid LM, so that the solvent may form a gas-liquid interface 131 above the position of an inflow tube 136. Thereby, a continuous liquid phase is formed to link a mixing unit 12, a gas-liquid separation unit 16 and a recovery tank through a pipe 14. Into the convolute flow-producing tank 130 having the solvent pooled therein, a reaction liquid LM is spouted from the inflow tube 136. The flow speed of the spouted reaction liquid LM is, as described above, controlled to twice as large as or larger than that of the reaction liquid LM flowing through the pipe 14, and a real inflow speed is controlled to 2 m/second or larger. Thereby, a convolute flow is formed in the solvent inside the convolute flow-producing tank 130. In this case as well, the convolute flow produced in the reaction liquid LM inside the convolute flow-producing tank 130 exerts a centrifugal force on the reaction liquid LM. Owing to the centrifugal force, the metal microparticles with high specific gravity in the reaction liquid (liquid), which has been formed by a reaction while flowing through the pipe 14, tends to gather in the periphery inside the convolute flow-producing tank 130, and a byproduct gas (gas) having a low specific gravity tends to gather in the central part of the convolute flow-producing tank 130. Then, the metal microparticles contained in the reaction liquid LM move downward in the solvent along the inner wall of the convolute flow-producing tank 130 while convoluting. On the other hand, a byproduct gas having a low specific gravity gathers in the center inside the convolute flow-producing tank 130, moves upward, and is collected in the upper part of the convolute flow-producing tank 130. Accordingly, the byproduct gas is continuously and efficiently removed from the reaction liquid LM having flowed into the convolute flow-producing tank 130. Furthermore, because the reaction liquid LM containing the metal microparticles is spouted into the solvent in the convolute flow-producing tank 130 to be diluted, the metal microparticles having smaller particle sizes are easily formed. Then, the metal microparticles suspended in the solvent which have moved downward to the bottom part inside the convolute flow-producing tank 130, are discharged to the pipe 14 together with the solvent in the convolute flow-producing tank 130. In this case as well, it is important to keep the pressure of a headspace part 130A in the convolute flow-producing tank 130 constant, and as in the case of FIG. 22, it is further preferable to install a pump 20 in the pipe 14.

(6) Open Channel Type

Figure 23:
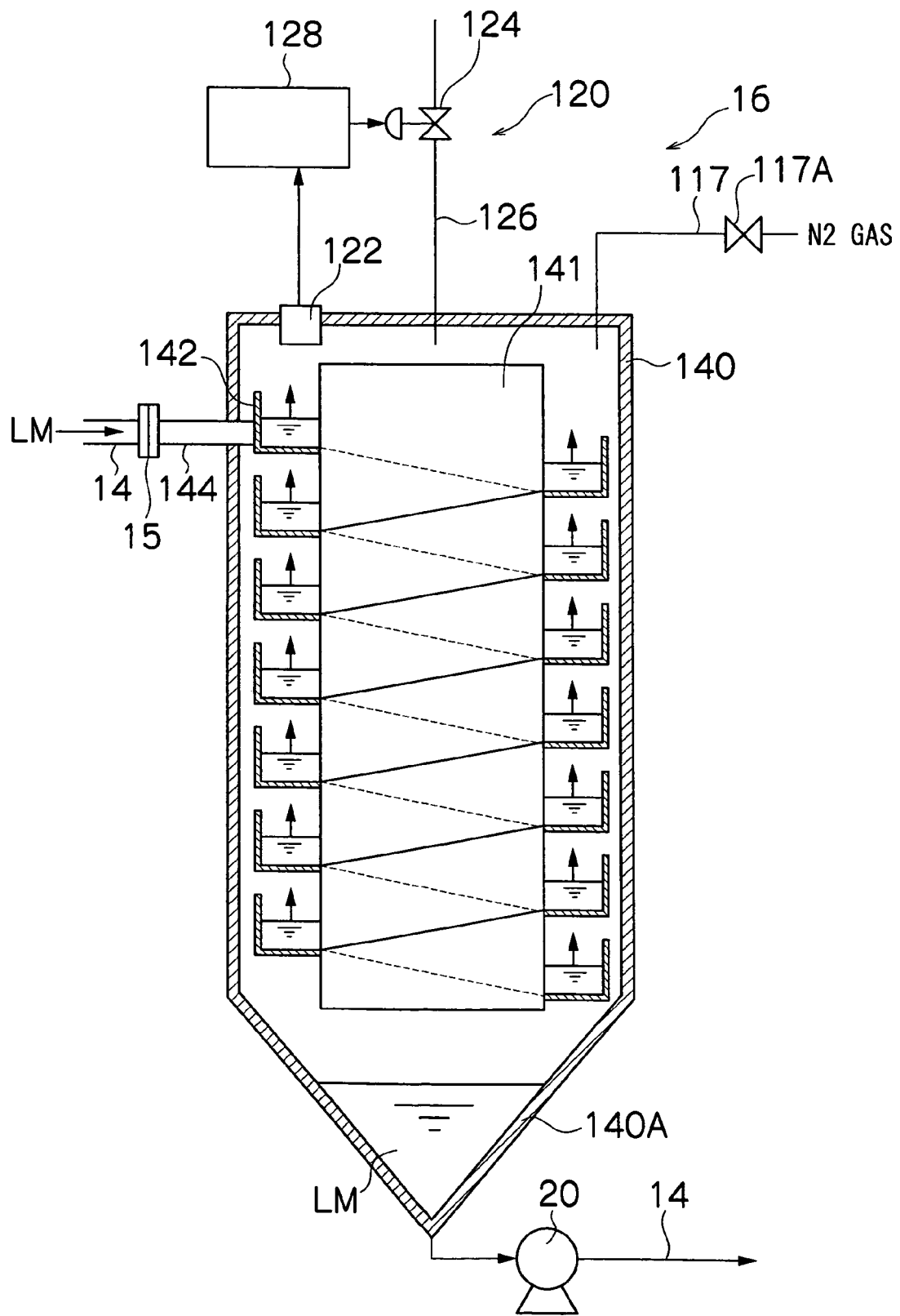
FIG. 23 is a sectional view of a gas-liquid separation unit of an open channel type.
Figure 24:
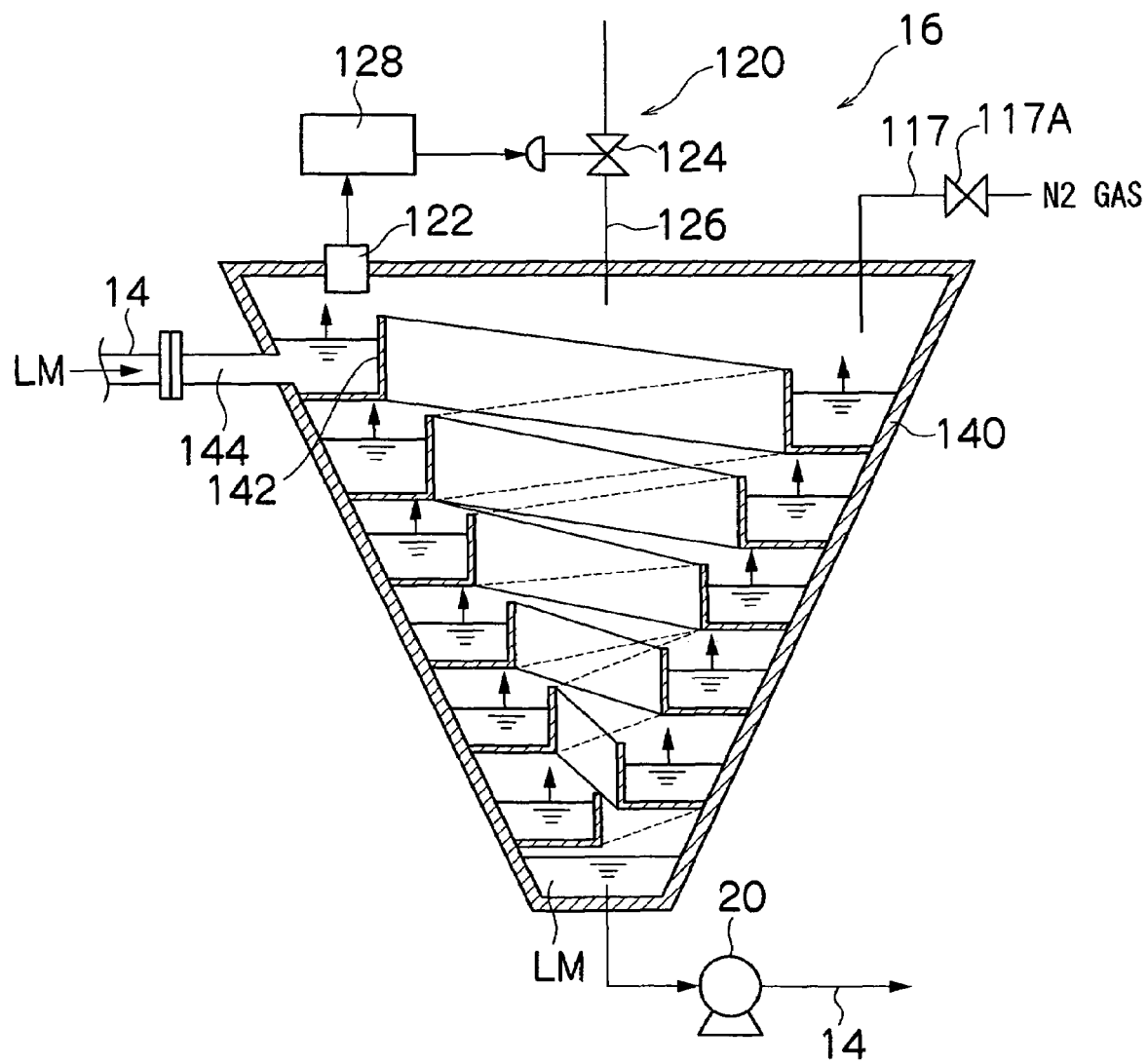
FIG. 24 is a sectional view for another embodiment of a gas-liquid separation unit of an open channel type.

FIGS. 23 and 24 are longitudinal sectional views of the gas-liquid separation unit 16 of an open channel type. In FIG. 23, a cylindrical tank 140 with a spiral channel has a columnar member 141 vertically installed in the center of the tank, and the columnar member 141 has a spiral channel 142 formed so as to spirally coil around the peripheral surface. In addition, in FIG. 24, a reversely cone-shaped spiral channel tank 140 has a spiral channel 142 formed therein around the inner wall. As shown in FIGS. 23 and 24, the gas-liquid separation unit 16 mainly comprises a troughed spiral channel 142 which is connected to a midway of the pipe 14, and has the upper face opened, a spiral channel tank 140 for housing the spiral channel 142, and a pressure adjustment device 120 for adjusting a pressure in the spiral channel tank 140.

A spiral channel 142 has a spiral shape formed from the top to the vicinity of a lower part of a spiral channel tank 140, and has an inflow tube 144 installed in an inlet of the spiral channel 142, which is connected to the pipe through a flange 15. The spiral channel 142 is formed so as to have enough length for the reaction of a reaction liquid LM to end, or equivalently, for the generation of a byproduct gas by the reaction of the reaction liquid LM to end, and the byproduct gas is floated while the reaction liquid LM flows downward through the spiral channel 142 by gravity. In this case, the width and the spiral gradient of the spiral channel 142 are set so that the flow speed of the reaction liquid LM flowing downward through the spiral channel 142 is approximately equal to that of the reaction liquid LM flowing through the pipe 14 connected to the inflow tube 144. In addition, in the bottom part of the spiral channel tank 140, a funnel-shaped reaction liquid recovery section 140A is installed, and the liquid recovery section 140A is connected to the pipe 14 linked to the second mixing unit 18. Then, the degassed reaction liquid LM flowing downward through the spiral channel 142 and collected in the reaction liquid exhaust section 140A is, as in the case of the above described gas-liquid separation unit 16 of the cyclone type, continuously discharged based on the balance between a pressure in the spiral channel tank 140 and flow resistance in the pipe 14. In this case, it is advisable to control the pressure in the spiral channel tank 140 constant so as to balance the inflow charged into the spiral channel tank 140 and the outflow discharged from the spiral channel tank 140. In addition, when a pump 20 is installed in the pipe 14 linked to the reaction liquid recovery section 140A as shown in FIGS. 23 and 24, it is further preferable to discharge the reaction liquid so as to balance the inflow charged into the spiral channel tank 140 with the outflow discharged from the spiral channel tank 140, by means of the pump 20.

A pressure adjustment device 120 mainly comprises a pressure sensor 122 for measuring a pressure in a spiral channel tank 140, a vent pipe 126 with a valve 124 for exhausting a byproduct gas accumulated inside the spiral channel tank 140, and a control part 128 for opening and closing the valve 124 on the basis of a measured value by the pressure sensor 122. Thus, the pressure adjustment device 120 controls the pressure in the spiral channel tank 140 so as to be kept constant. In this case as well, the valve 124 to be used opens and closes preferably both at a speed of response of 10 milliseconds or shorter, and further preferably of 5 milliseconds or shorter. As for the valve opening and closing both in the speed of response of 5 milliseconds or shorter, a servo valve is available. In addition, when the valve 124 has the response speed of 10 milliseconds or longer, a resistor (not shown) for decreasing a discharge rate of the byproduct gas may be installed at some point of the vent pipe 126 including the valve 124, to make a pressure control easy. As the resistor, an orifice or a filter can be preferably used.

In the gas-liquid separation unit 16 of the open channel type configured as described above, a reaction liquid LM flowing into a troughed spiral channel 142 from an inflow tube 144 flows downward at the flow rate equal to that during flowing through a pipe 14. While the reaction liquid LM flows downward, a byproduct gas continuously generated with the proceeding of the reaction changes to bubbles, which move up to a liquid level, and is removed from the opened top face of the spiral channel 142. Thus, the byproduct gas generated with the proceeding of the reaction can be continuously removed from the reaction liquid. Accordingly, a unit 10 for continuously producing metal microparticles can be easily constructed only by installing a gas-liquid separation unit 16 of an open channel type in a midway of the pipe 14 which connects the first mixing unit 12 with the second mixing unit 18. In addition, in the gas-liquid separation unit 16 of the open channel type, the flow speed of the reaction liquid LM flowing through the spiral channel 142 is equalized to that of the liquid flowing through the pipe 14, and the degassed reaction liquid LM collected in the low part of the spiral channel tank 140 is extracted in the amount equal to the amount of flowing downward through the spiral channel 142, so that the flow of the reaction liquid LM flowing through the pipe 14 can be stabilized in the pipe 14 in front and in the rear of the gas-liquid separation unit 16 of the open channel type. In addition, the gas-liquid separation unit 16 can be made compact by employing the spiral channel 142.

As described above, in a unit 10 for continuously producing metal microparticles according to the present invention, first and second solutions are separately prepared, and the two solutions are instantly mixed by any one first mixing unit 12 of a high-speed stirring and mixing type, a narrow-gap mixing type and a high-pressure mixing type, and then, are immediately discharged from the first mixing unit 12 to the pipe 14. An early reaction caused by the mixing proceeds with the flow of a reaction liquid LM flowing through the pipe 14, and at the same time continuously generates a byproduct gas with the proceeding of the reaction. Any one gas-liquid separation unit 16 of a tubular channel type, a cyclone type and an open channel type, finishes the reaction for forming the metal microparticles being generated by the reaction of the first and second solutions, while continuously removing the byproduct gas. Any second mixing unit 18 of a high-speed stirring and mixing type, a narrow-gap mixing type and a high-pressure mixing type, continuously supplies the third solution L3 to the reaction liquid LM degassed in the gas-liquid separation unit 16, and continuously introduces (dopes) dissimilar metal atoms to the crystal lattices of the metal microparticles formed in the early reaction. Thereby, the metal microparticles of a multicomponent alloy are produced.

Thus, the adoption of a flow reaction system which initiates the early reaction of first and second solutions caused by mixing in a pipe, enables the continuous production of metal microparticles. However, in this case, it is important to stabilize the flow of a reaction liquid and uniformize the reaction by stably removing a byproduct gas from the reaction liquid flowing through a pipe 14. In a continuous process for producing the metal microparticles according to the present invention, a gas-liquid separation unit 16 installed in a midway of the pipe 14 makes the reaction of the first and second solutions mixed in the first mixing unit 12 proceed in the pipe 14 between the first mixing unit 12 and the second mixing unit 18, and continuously removes the byproduct gas generated with the proceeding of the reaction so as not to destabilize the flow of a reaction liquid LM supplied through the pipe 14.

Thereby, the reaction accompanied by the generation of a byproduct gas can be uniformized, and consequently metal microparticles having superior monodispersibility can be produced. In addition, it is considered that the equilibrium of a reaction moves to a reaction acceleration side to improve the reactivity by continuous degassing, and then it enables a prompt reaction and consequently can minimize the sizes of the metal microparticles. Furthermore, when solutions are mixed in the second mixing unit 18, they can be uniformly mixed in the second mixing unit 18 because the solutions do not contain a byproduct gas, and the consequent uniform mixing improves the uniformity of doping of dissimilar metal atoms. In addition, in the case of controlling a solution temperature for the reaction, a gas-liquid separation unit 16 can effectively remove the byproduct gas in the flow of continuous treatment, thereby improves the control accuracy for a solution temperature, and consequently reduces the size of the produced microparticles and improves the dispersibility. Furthermore, because the continuous production process for the metal microparticles of a multicomponent alloy is established like in the present invention, the process eliminates batch-by-batch variations in the quality of metal microparticles like production in a conventional batch system, and thereby enables the metal microparticles of a multicomponent alloy to be stably produced so as to have small sizes, adequate monodispersibility and a constant quality.

In addition, as shown in FIGS. 17, 18, 21A, 21B, 22, 23 and 24, gas-liquid separation units 16 of a tubular channel type, a cyclone type and an open channel type can have a purging pipe 117 with a valve 117A installed for purging air with an inert gas such as nitrogen gas ($N_2$ gas). In addition, the purging with the inert gas may be carried out not only in the gas-liquid separation unit 16, but preferably in the all units of a unit for continuously producing metal microparticles according to the present invention. Then, the purging pipe 117 supplies the inert gas, when the reaction is anaerobic, or a byproduct gas generated by the reaction is a dangerous gas in the presence of oxygen, such as hydrogen gas, into the all units of the continuous production unit through itself, to purge air in the units and fill the inert gas. Furthermore, the method of purging air in the gas-liquid separation unit 16 with the inert gas to previously increase the pressure in the gas-liquid separation unit 16, and then making a reaction liquid LM inflow can easily control the pressures in the tanks of the units constant.

EXAMPLE

In a nitrogen gas of high purity, the following operation was carried out.

Into a metal salt aqueous solution containing 0.46 g of iron (III) triammonium trioxalate trihydrate ($Fe(NH_4)_3(C_2O_4)_3$) (made by Wako Pure Chemical Industries, Ltd.) and 0.46 g of potassium chloroplatinate ($K_2PtCl_4$) (made by Wako Pure Chemical Industries, Ltd.) dissolved in 24 ml of $H_2O$ (previously deoxygenated), an alkane solution containing 14.0 g of aerosol OT (made by Wako Pure Chemical Industries, Ltd.) dissolved in 80 ml of decane (made by Wako Pure Chemical Industries, Ltd.) was added and mixed to prepare the reversed micelle solution which is a first solution L1.

Into the solution of a reducing agent having 0.50 g of $NaBH_4$ (made by Wako Pure Chemical Industries, Ltd.) dissolved in 12 ml of $H_2O$ (previously deoxygenated), an alkane solution having 5.4 g of aerosol OT (made by Wako Pure Chemical Industries, Ltd.) mixed with 40 ml of decane (made by Wako Pure Chemical Industries, Ltd.) was added and mixed to prepare the reversed micelle solution which is a second solution L2.

Into a metal salt aqueous solution having 0.09 g of copper chloride ($CuCl_2.6H_2O$) (made by Wako Pure Chemical Industries, Ltd.) dissolved in 2 ml of $H_2O$ (previously deoxygenated), an alkane solution having 3.5 g of aerosol OT (made by Wako Pure Chemical Industries, Ltd.) dissolved in 20 ml of decane (made by Wako Pure Chemical Industries, Ltd.) was added and mixed to prepare the reversed micelle solution which is the third solution L3.

Into an aqueous solution having 0.88 g of ascorbic acid (made by Wako Pure Chemical Industries, Ltd.) and 0.33 g of a chelating agent (DHEG) dissolved in 12 ml of $H_2O$ (previously deoxygenated), an alkane solution having 5.4 g of aerosol OT (made by Wako Pure Chemical Industries, Ltd.) and 2 ml of olein amine (made by Tokyo Kasei Kogyo Co., Ltd.) dissolved in 40 ml of decane (made by Wako Pure Chemical Industries, Ltd.) was added and mixed to prepare the reversed micelle solution which is the fourth solution L4.

In a conventional method for producing metal microparticles, the above described 4 reversed micelle solutions (LM 1, 2, 3 and 4) were blended in one tank with a batch system in the following way. A reversed micelle solution (L2) was instantly added to a reversed micelle solution (L1) which is stirred at a high speed by an omni mixer (made by Yamato Scientific. Co., Ltd.) at 22° C. After 3 minutes, the reversed micelle solution (L3) was further added at the rate of about 2.4 ml/minute for about 10 minutes. Five minutes after finishing the addition, the omni mixer was replaced with a magnetic stirrer, the solution temperature was raised to 40° C., then the reversed micelle solution (L4) was added, and the mixed solution was aged for 120 minutes. The metal microparticle obtained thereby is called a conventional method sample.

In contrast to this, in a method for continuously producing metal microparticles according to the present invention, a reversed micelle solution (L1) and a reversed micelle solution (L2) were instantly mixed with the use of any one of mixing units explained in FIGS. 2 to 16 for the first mixing unit 12 in FIG. 1. A reaction liquid LM was taken out from the first mixing unit 12 immediately when the mixing was finished, was sent to a gas-liquid separation unit 16, in which a byproduct gas generated by a reaction was removed, and after 10 minutes, the reaction liquid LM was sent to the second mixing unit 18 shown in FIG. 1. To the second mixing unit 18, the reversed micelle solution (L3) was added and instantly mixed. The liquid in the second mixing unit 18 was collected to a mixing tank 23, in five minutes after the addition of the reversed micelle solution (L3) was finished, the stirring was changed to slow stirring with the use of a stirring impeller 23a, the liquid temperature was raised to 40° C., then the reversed micelle solution (LA) was added, and the mixed solution was aged for 120 minutes. Thus obtained metal microparticle is called a present invention method sample.

Then, both the conventional method sample and the present invention method sample were cooled to room temperature, then 2 ml of oleic acid (made by Wako Pure Chemical Industries, Ltd.) was added, and the resultant solution was mixed and taken out to the atmosphere. In order to disrupt the reversed micelle state, the mixed liquid of 200 ml of $H_2O$ with 200 ml of methanol was added to the solution to separate it into a water phase and an oil phase. In an oil phase, metal nanoparticles of a dispersed state were obtained. The oil phase was washed five times with a mixed liquid of 600 ml of $H_2O$ and 200 ml of methanol. Then, 1,300 ml of methanol was added to flocculate and settle the metal nanoparticles. The supernatant liquid was removed, 20 ml of heptane (made by Wako Pure Chemical Industries, Ltd.) was added to redisperse the metal nanoparticles, and 100 ml of methanol was added to sediment the metal nanoparticles. The treatment was repeated twice, and finally 5 ml of octane (made by Wako Pure Chemical Industries, Ltd.) was added to obtain a metallic-nanoparticle dispersion containing fine metal particles of a multicomponent alloy of FeCuPt with the particle diameter of a nanometric level.

The metal nanoparticles obtained by a conventional method and a method according to the present invention were subjected to the measurement of its yield, its composition, its volume, its average particle diameter and particle size distribution (coefficient of variation), and its coercive force. Here, the composition and the yield were measured with ICP spectrochemical analysis (inductively coupled plasma atomic emission spectrochemical analysis), and the volume, the average particle diameter and the particle size distribution were determined by statistically processing the values obtained through measuring the particle diameters of the particles photographed with a TEM. In addition, the coercive force was measured with the use of a high-sensitive magnetization vector measuring instrument made by Toei Industry Co., Ltd. and a data processing unit made by the same company in the condition of an applied magnetic field of 790 kA/m (10 kOe). The metal nanoparticles were prepared and used for the measurement, by means of collecting the metal nanoparticles from a prepared dispersion containing the metal nanoparticles, thoroughly drying them and heating them at 550° C. for 30 minutes in an electric furnace.

The measured results of the metal nanoparticles obtained by a conventional method and a method according to the present invention are shown in Table 1.

TABLE 1

|  | Metal nanoparticles by a conventional method | Metal nanoparticles by a method according to the present invention |
|---|---|---|
| Yield | 65% | 80% |
| Composition | FeCuPt = 52/20/28 | FeCuPt = 42/16/42 |
| Volume average particle diameter | 5.3 nm | 5.1 nm |
| Particle size distribution (coefficient of variation) | 15% | 5% |
| Coercive force | 450 kA/m | 501.4 kA/m |

As seen from results in Table 1, the metal nanoparticles obtained by a method according to the present invention showed smaller sizes and better monodispersibility than those of the metal nanoparticles obtained by a conventional method. In addition, a method according to the present invention provided an increased percentage of Pt content in the composition and an enhanced coercive force, compared to those by a conventional method.

What is claimed is:

1. A producing unit for continuously producing metal microparticles formed of a multicomponent alloy accompanied by the generation of a byproduct gas through an early reaction of the formation of the metal particles, comprising:
   a first mixing unit for continuously supplying and mixing at least a first solution and a second solution for conducting an early reaction and forming a reaction liquid containing metal microparticles;
   a second mixing unit for continuously supplying third solution to the reaction liquid and for mixing the third solution and the reaction liquid to introduce dissimilar metal atoms into the crystal lattices of the metal microparticles and to form a mixed solution;
   a pipe connecting the first mixing unit and the second mixing unit; and
   a gas-liquid separation unit installed in a midway position of the pipe,
   wherein the pipe is made so as to have enough length to finish the early reaction, continuously passes the reaction liquid to the second mixing unit from the first mixing unit, and continuously removes a byproduct gas generated as the early reaction proceeds.

2. The producing unit for continuously producing metal microparticles according to claim 1, wherein the first solution contains two or more metal ions selected from the group consisting of families 8, 9 and 10 in the periodic table, the second solution contains a reducing agent; and the third solution contains one or more metal ions selected from the group consisting of families 11, 12, 13, 14 and 15 in the periodic table.

3. The producing unit for continuously producing metal microparticles according to claim 1, wherein at least one of the first and the second mixing units is a high-speed stirring and mixing unit that has stirring blades of which the tips rotate at a rotational peripheral velocity of 5 m/second or higher inside a mixing tank which has such a narrow volume as has the retention time of 10 seconds or shorter, and that instantly and uniformly mixes the solutions and immediately discharges the reaction liquid or the mixed solution from the mixing tank.

4. The producing unit for continuously producing metal microparticles according to claim 1, wherein at least one of the first and the second mixing units is a narrow-gap mixing unit which conducts mixing with a narrow-gap formed between the inner wall of a mixing vessel and a stirring member rotating at a high speed in the mixing vessel, and which, in order to form the narrow-gap, has a distance between the rotation center of the stirring member and the inner wall closest therefrom set in a range of 1.001 to 1.200 when the distance between the rotation center of the stirring member and the tip is defined as 1, and which instantly and uniformly mixes the solutions and immediately discharges the reaction liquid or the mixed solution from the mixing vessel.

5. The producing unit for continuously producing metal microparticles according claim 1, wherein at least one of the first and second mixing units is a high-pressure mixing unit which supplies at least one solution into a mixing chamber having a retention time of 5 seconds or shorter, in the form of a jet flow with a high pressure of 1 MPa or higher, and which instantly and uniformly mixes the solutions and immediately discharges the mixed solution or reaction liquid from the mixing chamber.

6. The producing unit for continuously producing metal microparticles according to claim 1, wherein the gas-liquid separation unit comprises:
   a gas-liquid separation structure which is connected to a midway position of the pipe, has a larger space than the pipe in terms of a volume per unit length, and has a gas-liquid interface formed when a reaction liquid flows through the space, and;
   a pressure adjustment device for adjusting the pressure of a headspace part above the gas-liquid interface, and
   wherein the gas-liquid separation unit continuously removes the byproduct gas contained in the reaction liquid by floatation, while the reaction liquid passes through the gas-liquid separation structure.

7. The producing unit for continuously producing metal microparticles according to claim 1, wherein the gas-liquid separation unit comprises:
   a convolute flow-producing tank which is connected to a midway position of the pipe, and produces a convolute flow in a reaction liquid;
   a convolute flow-speed adjustment device for making a real flow speed to be 2 m/second or higher, along with making the inflow speed of the reaction liquid flowing into the convolute flow-producing tank to be twice as large as or larger than the flow speed of the reaction liquid flowing through the pipe, and;
   a pressure adjustment device for adjusting a pressure in the convolute flow-producing tank, and
   wherein the gas-liquid separation unit continuously removes the byproduct gas from the reaction liquid by taking advantage of a centrifugal force generated by the convolute flow of the reaction liquid containing the byproduct gas having a different specific gravity from that of the reaction liquid.

8. The producing unit for continuously producing metal microparticles according to claim 1, wherein the gas-liquid separation unit comprises:
   a troughed spiral channel which is connected to a midway position of the pipe and has the upper part opened;
   a spiral channel tank housing the spiral channel; and
   a pressure adjustment device for adjusting the pressure in the spiral channel tank, and
   wherein the gas-liquid separation unit continuously removes the byproduct gas in the reaction liquid by floatation, while passing the reaction liquid downward through the spiral channel at the approximately same speed as the flow speed of the reaction liquid flowing in the pipe.

9. The producing unit for continuously producing metal microparticles according to claim 1, wherein, in order to control a reaction in the second mixing unit, a duration time necessary for the reaction liquid having flowed out from the first mixing unit to reach the second mixing unit through the gas-liquid separation unit is set.

10. The producing unit for continuously producing metal microparticles according to claim 9, wherein the duration time is set to one minute or longer but 20 minutes or shorter.

11. The producing unit for continuously producing metal microparticles according to claim 1, further comprising:
   a third mixing unit for adding a chelating agent solution and a reducing agent solution and mixing the solutions, which is installed in a stage after the second mixing unit or in a position between the gas-liquid separation unit and the second mixing unit.

* * * * *